(12) United States Patent
Ouderkirk et al.

(10) Patent No.: US 12,455,443 B2
(45) Date of Patent: Oct. 28, 2025

(54) PANCAKE LENS WITH CONTROLLED CURVATURE

(71) Applicant: Meta Platforms Technologies, LLC, Menlo Park, CA (US)

(72) Inventors: Andrew John Ouderkirk, Kirkland, WA (US); Spencer Allan Wells, Seattle, WA (US); Liliana Ruiz Diaz, Bothell, WA (US); Renate Eva Klementine Landig, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 596 days.

(21) Appl. No.: 17/887,229

(22) Filed: Aug. 12, 2022

(65) Prior Publication Data

US 2024/0053598 A1 Feb. 15, 2024

(51) Int. Cl.
*G02B 3/12* (2006.01)
*G02B 17/00* (2006.01)
*G02B 26/00* (2006.01)
*G02B 27/01* (2006.01)
*G06F 1/16* (2006.01)

(52) U.S. Cl.
CPC .......... *G02B 26/004* (2013.01); *G02B 3/12* (2013.01); *G02B 17/004* (2013.01); *G02B 27/0172* (2013.01); *G06F 1/163* (2013.01); *G02B 2027/0178* (2013.01)

(58) Field of Classification Search
CPC .......... G02B 26/004; G02B 3/12; G02B 3/14; G02B 17/004; G02B 27/0172; G02B 27/286; G02B 27/0101; G02B 2027/0178; G02B 2027/0185; G02B 7/04; G06F 1/163
USPC ......................................................... 359/290
See application file for complete search history.

(56) References Cited

U.S. PATENT DOCUMENTS

| | | | |
|---|---|---|---|
| 9,557,568 B1 | 1/2017 | Ouderkirk et al. | |
| 10,036,831 B2 | 7/2018 | Yu et al. | |
| 10,429,657 B1 | 10/2019 | Sharma et al. | |
| 10,698,224 B1 | 6/2020 | Cooke et al. | |
| 10,881,287 B1 | 1/2021 | Ouderkirk et al. | |
| 10,914,871 B2* | 2/2021 | Smyth ...................... | G02C 7/06 |
| 2004/0014504 A1 | 1/2004 | Coates et al. | |
| 2010/0157438 A1* | 6/2010 | Griffith ..................... | G02B 3/14 |
| | | | 359/666 |
| 2010/0276492 A1* | 11/2010 | Wang ....................... | G02B 3/14 |
| | | | 359/665 |

(Continued)

*Primary Examiner* — William R Alexander
(74) *Attorney, Agent, or Firm* — Greenberg Traurig, LLP

(57) ABSTRACT

An example apparatus may include a display and an optical configuration configured to provide an image of a display, for example, in a head-mounted device. An example apparatus may include a display and an optical configuration including a first lens assembly and a second lens assembly. The first lens assembly may include a first lens, a first reflector, and an actuator. The second lens assembly may include a second lens and a second reflector. An example apparatus may include a controller configured to apply at least one electrical signal to the actuator to control the optical power of the first lens. The display light may pass through the actuator, which may be transparent and may include a plurality of actuator layers. Other devices, methods, systems and computer-readable media are also disclosed.

20 Claims, 17 Drawing Sheets

(56) References Cited

U.S. PATENT DOCUMENTS

| | | |
|---|---|---|
| 2019/0302479 A1* | 10/2019 | Smyth .................. G02B 26/004 |
| 2020/0096770 A1* | 3/2020 | Pedder ............... G02B 27/0172 |
| 2020/0096817 A1 | 3/2020 | Richards et al. |
| 2020/0333596 A1 | 10/2020 | Yoon et al. |
| 2021/0011204 A1* | 1/2021 | Mastrangelo .......... G02C 7/085 |
| 2022/0271214 A1 | 8/2022 | Ouderkirk et al. |
| 2022/0276483 A1 | 9/2022 | Ouderkirk et al. |

\* cited by examiner

PANCAKE LENS WITH CONTROLLED CURVATURE

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
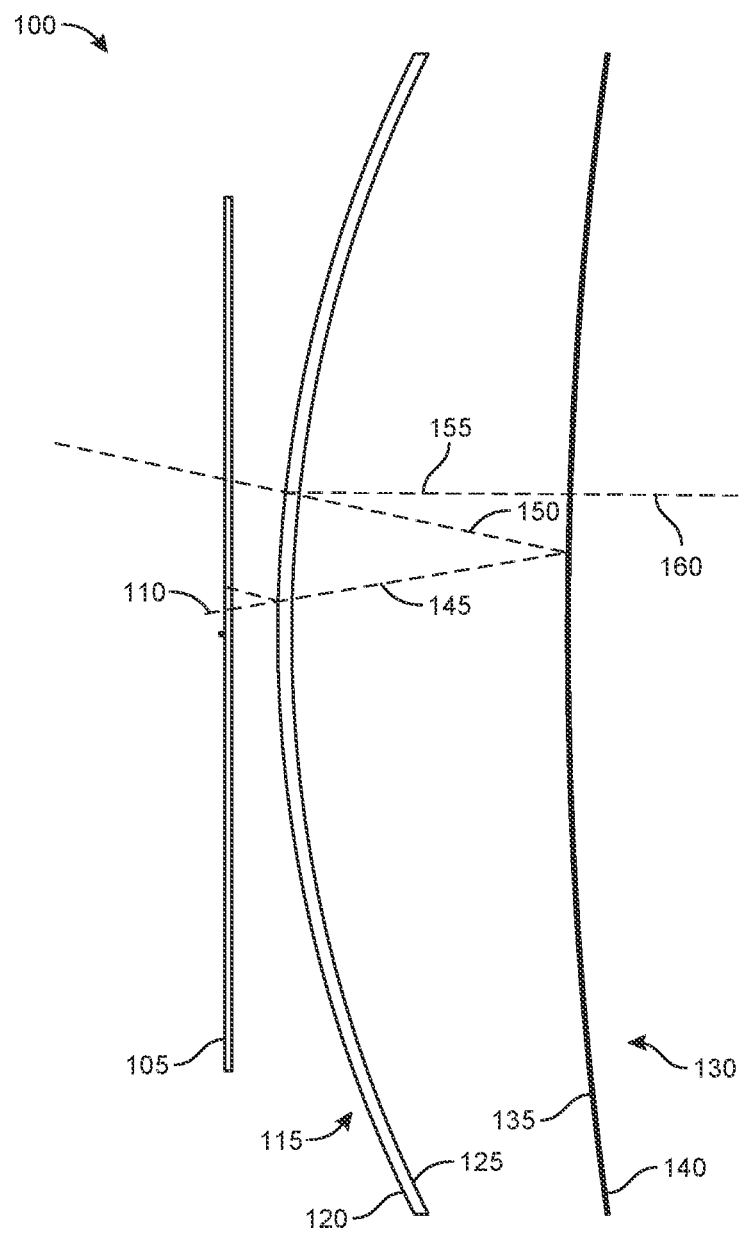
FIG. 1 shows an example optical configuration of a device in accordance with various embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure includes all modifications, equivalents and alternatives falling within the scope of the appended claims.

DETAILED DESCRIPTION OF EXEMPLARY EMBODIMENTS

The present disclosure is generally directed to optical configurations that may provide adjustable accommodation, devices including optical configurations and associated methods or apparatus. As is explained in greater detail below, embodiments of the present disclosure may include an optical configuration suitable for virtual and/or augmented reality systems. An optical configuration may include one or more lenses having adjustable accommodation.

Examples include lens assemblies having variable accommodation. Examples include relatively compact lenses, lenses with a relatively wide accommodation range and lenses with variable cylinder. Example varifocal lenses may provide prescriptive lens correction for users, for example, users of AR/VR apparatus. In this context, the term AR/VR apparatus may refer to an augmented reality (AR) and/or virtual reality (VR) apparatus.

Figure 2:
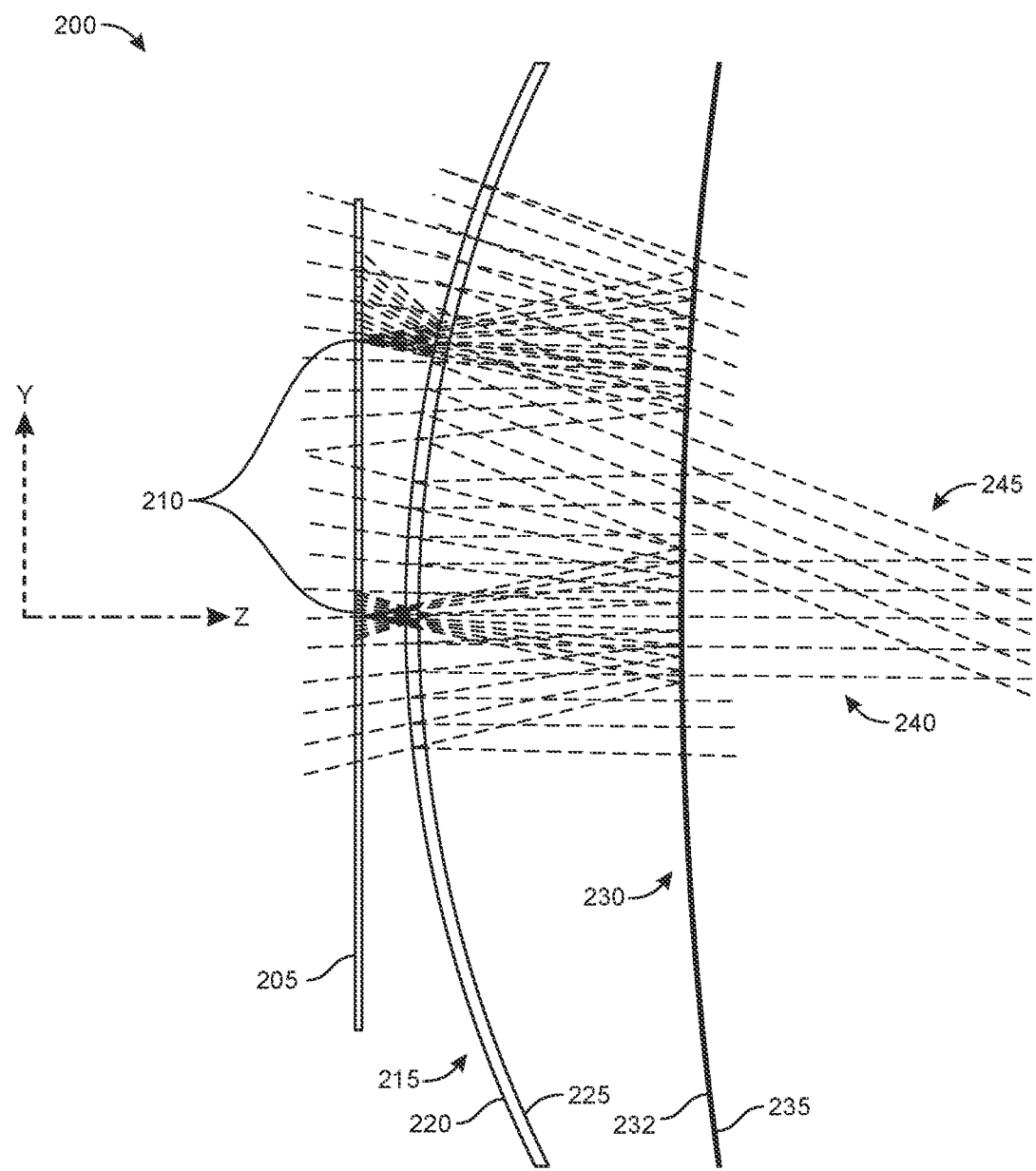
FIG. 2 shows an optical configuration including a display and varifocal lens assembly in accordance with various embodiments.
Figure 3:
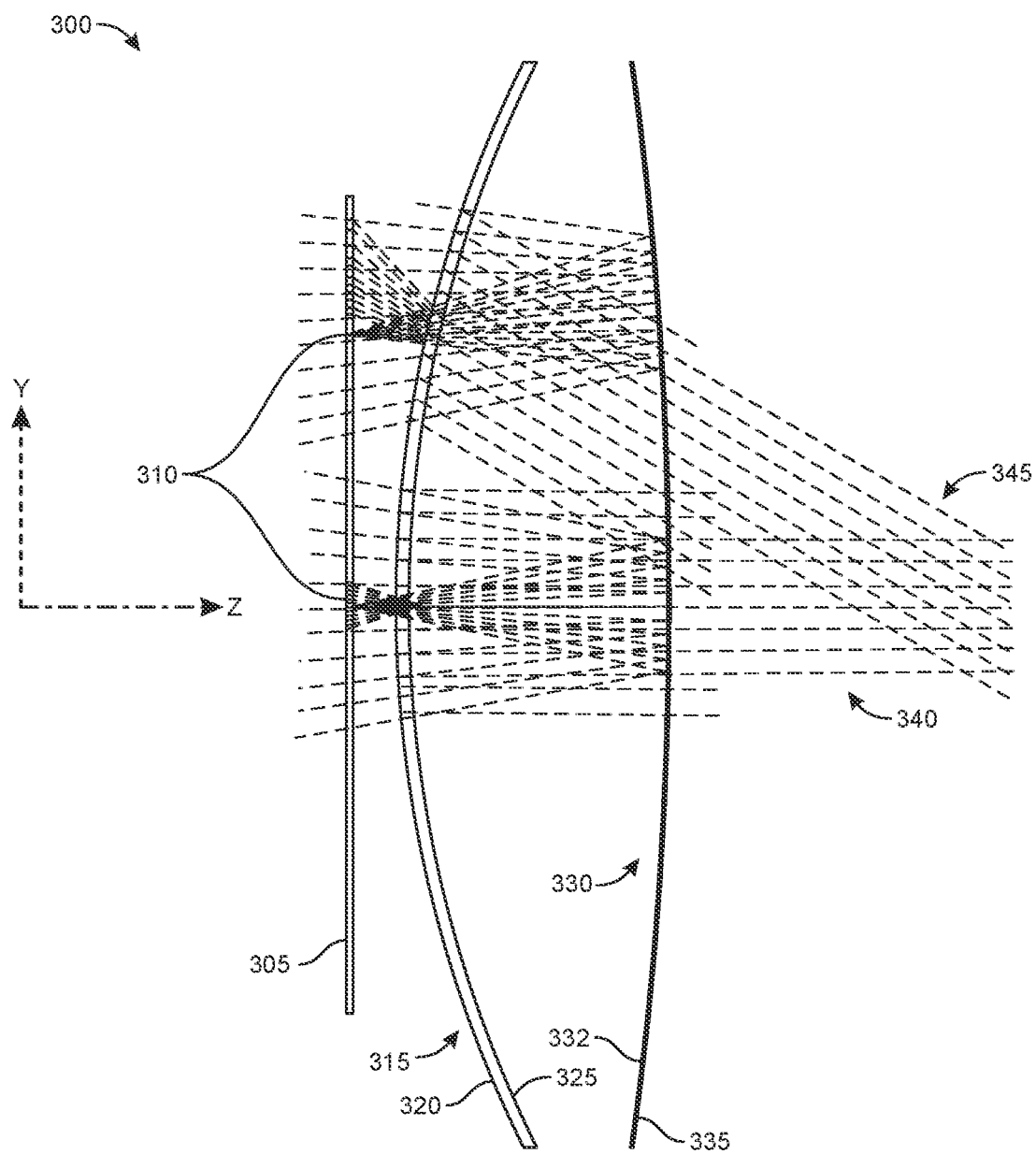
FIG. 3 shows light propagation through a cross section of an example lens assembly in accordance with various embodiments.
Figure 4:
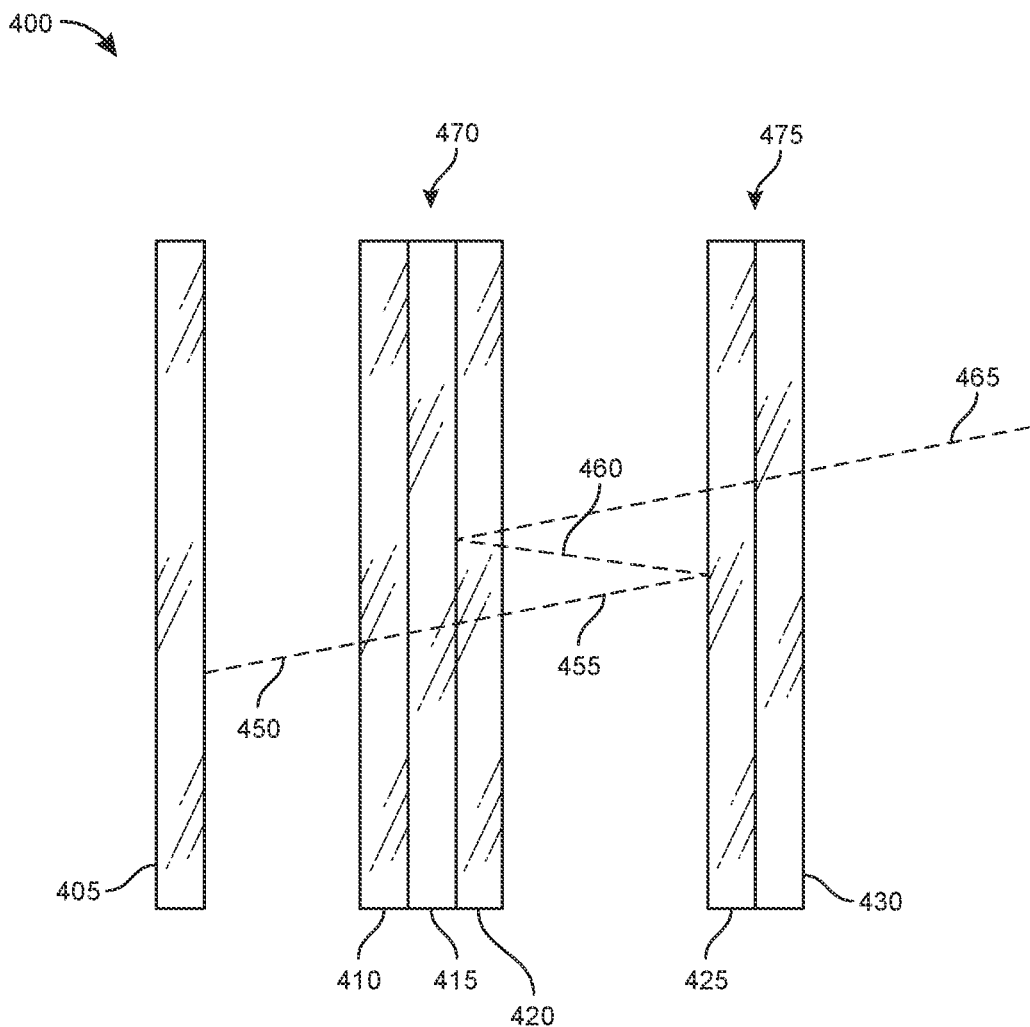
FIG. 4 is a schematic of an example optical configuration including at least one lens having an adjustable optical power in accordance with various embodiments.
Figure 5:
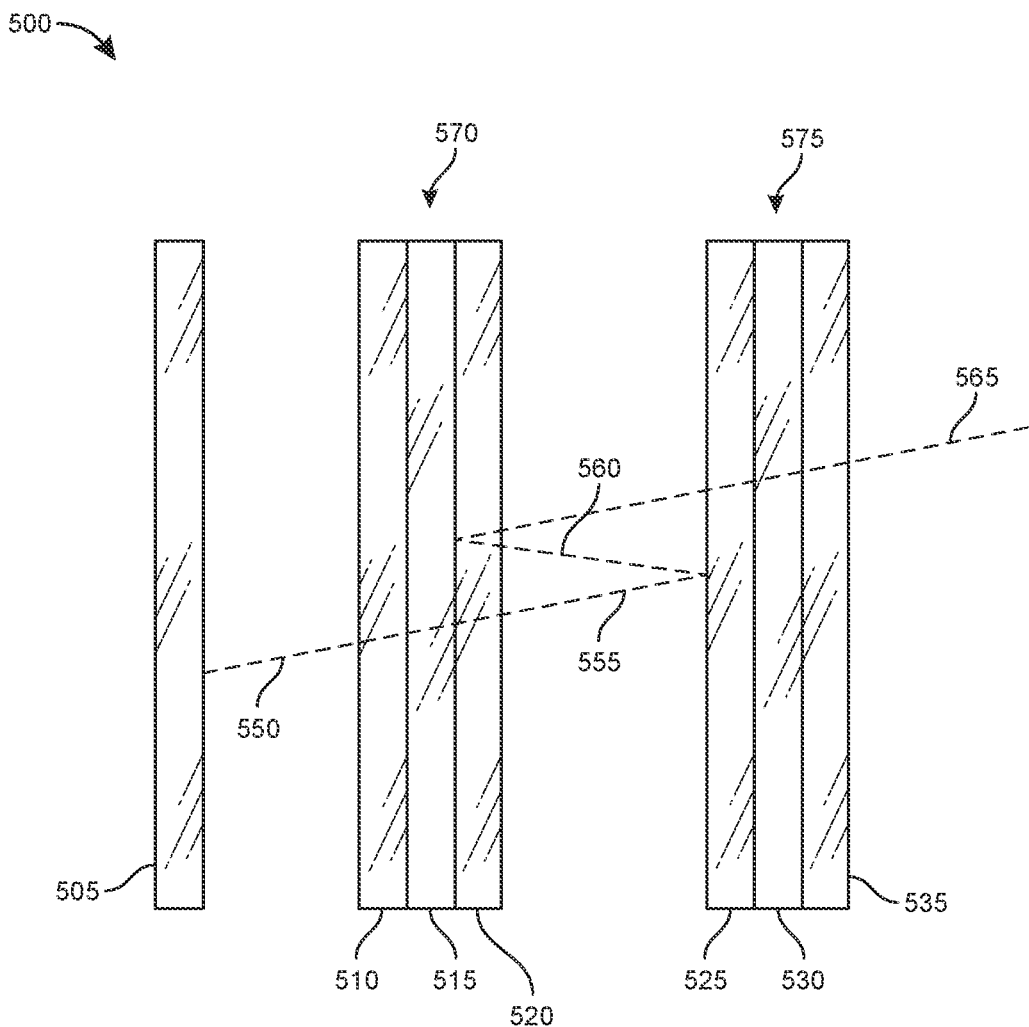
FIG. 5 is a schematic of an example optical configuration including at least one lens having an adjustable optical power and an absorbing optical polarizer, in accordance with various embodiments.
Figure 6:
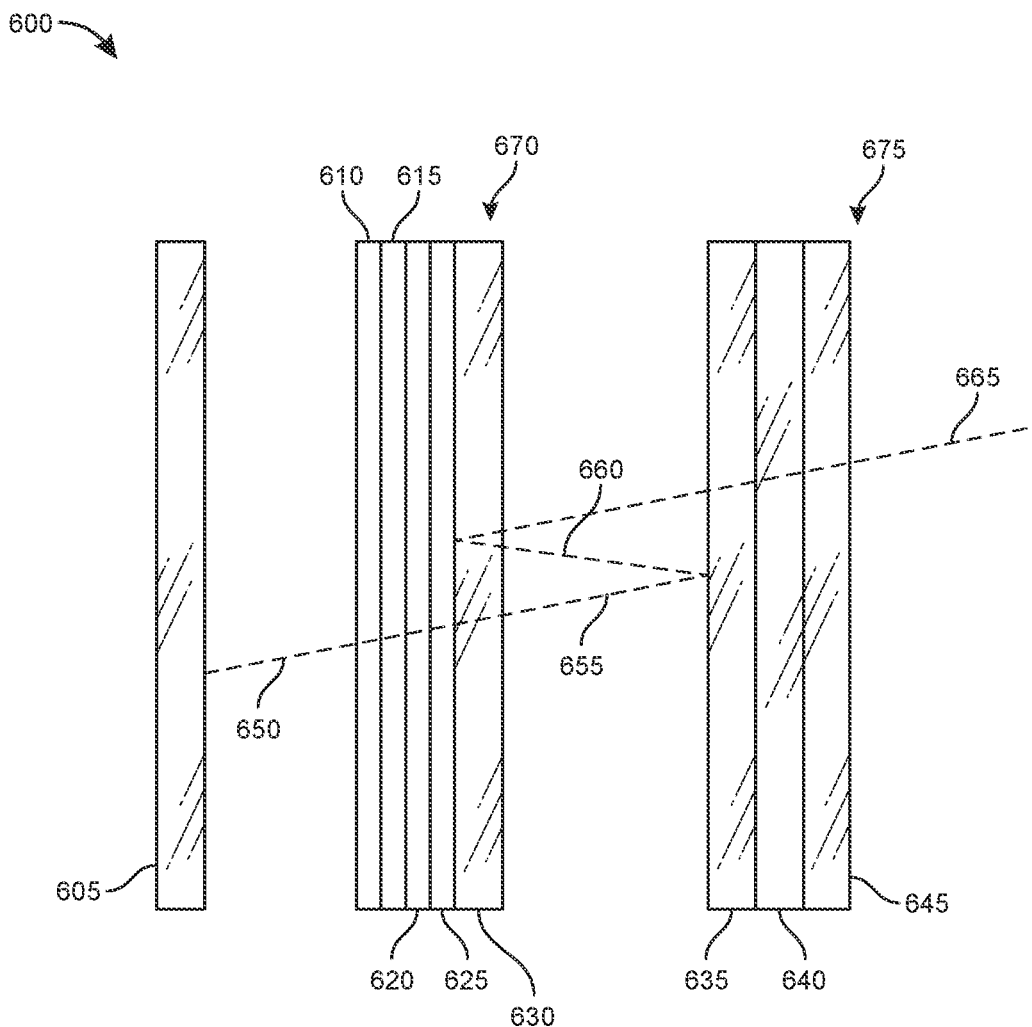
FIG. 6 is a schematic of a further example optical configuration including at least one lens having an adjustable optical power and at least one actuator, in accordance with various embodiments.
Figure 7:
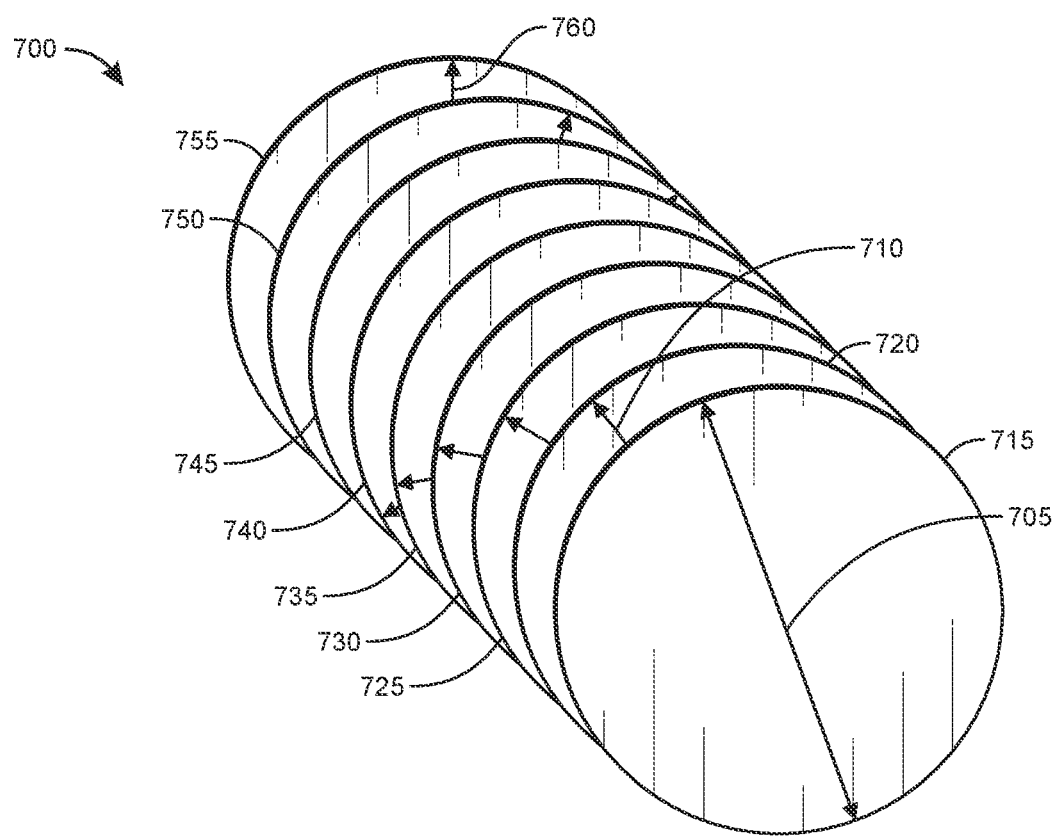
FIG. 7 shows an example actuator configuration, in accordance with various embodiments.
Figure 8:
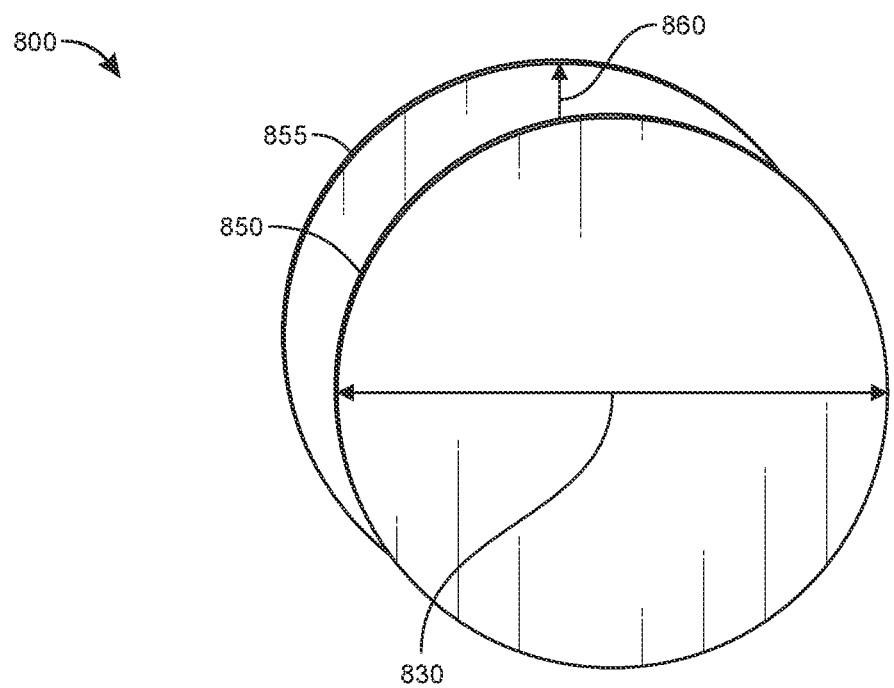
FIG. 8 shows an example actuator having a simplified configuration, in accordance with various embodiments.
Figure 9:
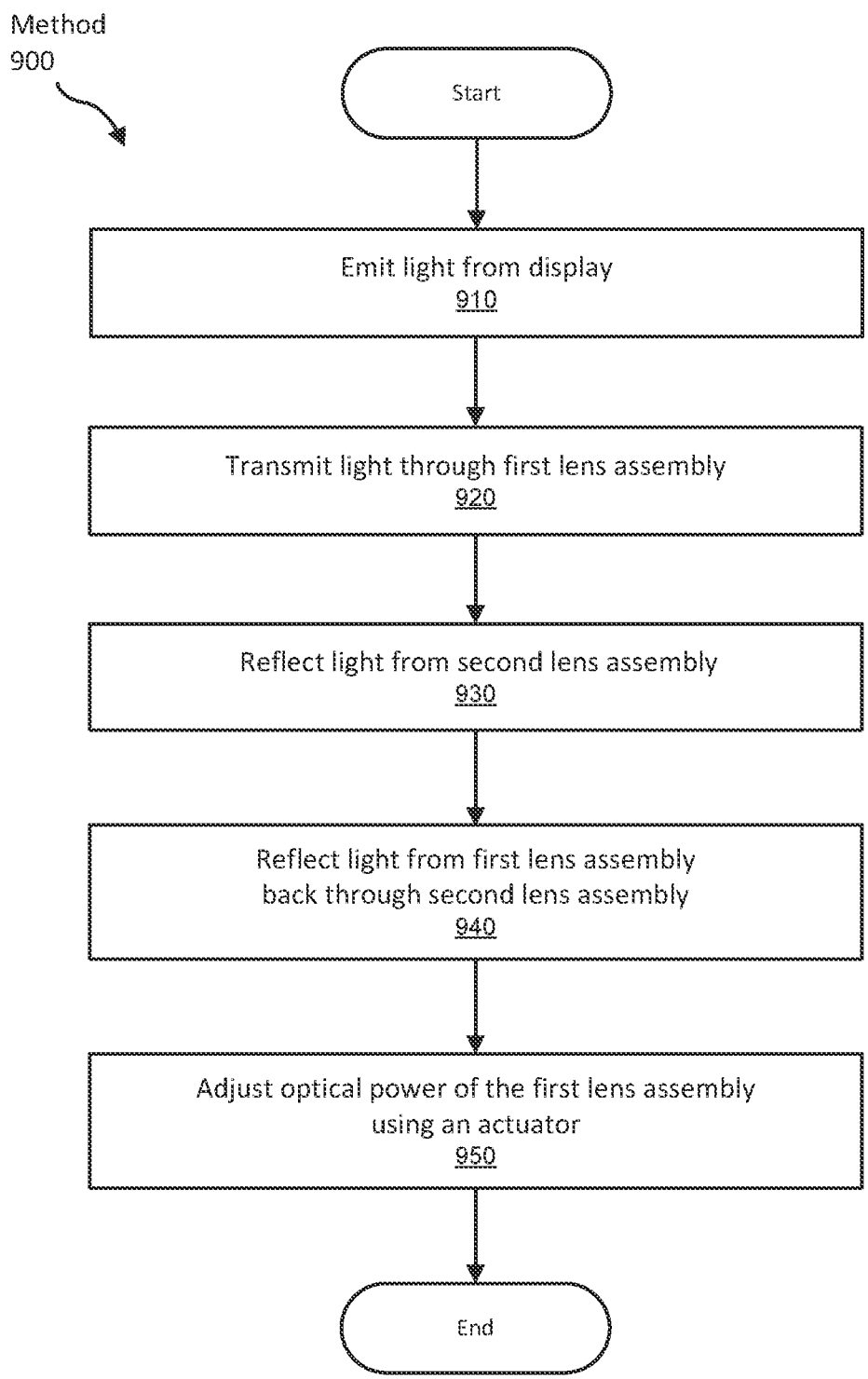
FIG. 9 shows an example method in accordance with various embodiments.
Figure 10:
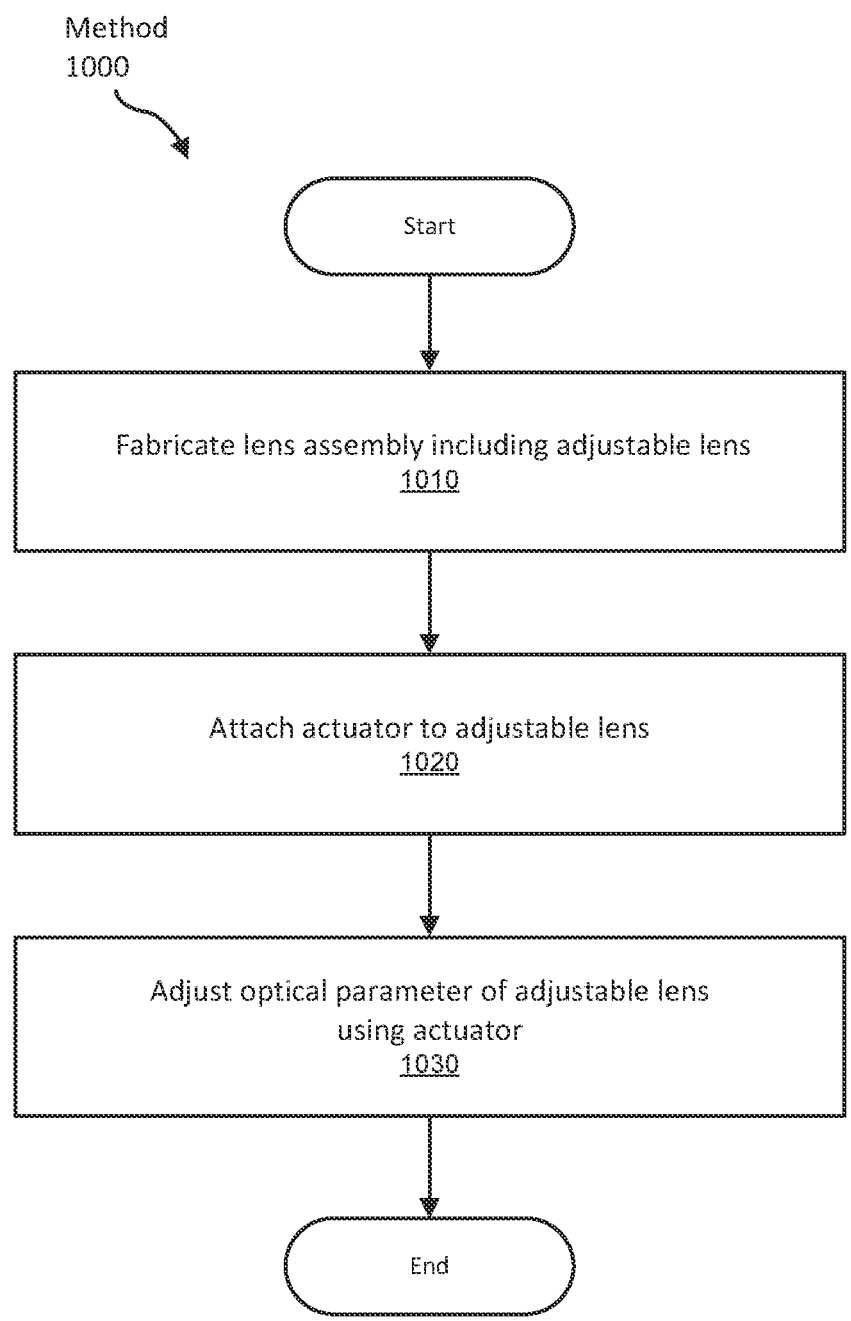
FIG. 10 shows a further example method in accordance with various embodiments.
Figure 11:
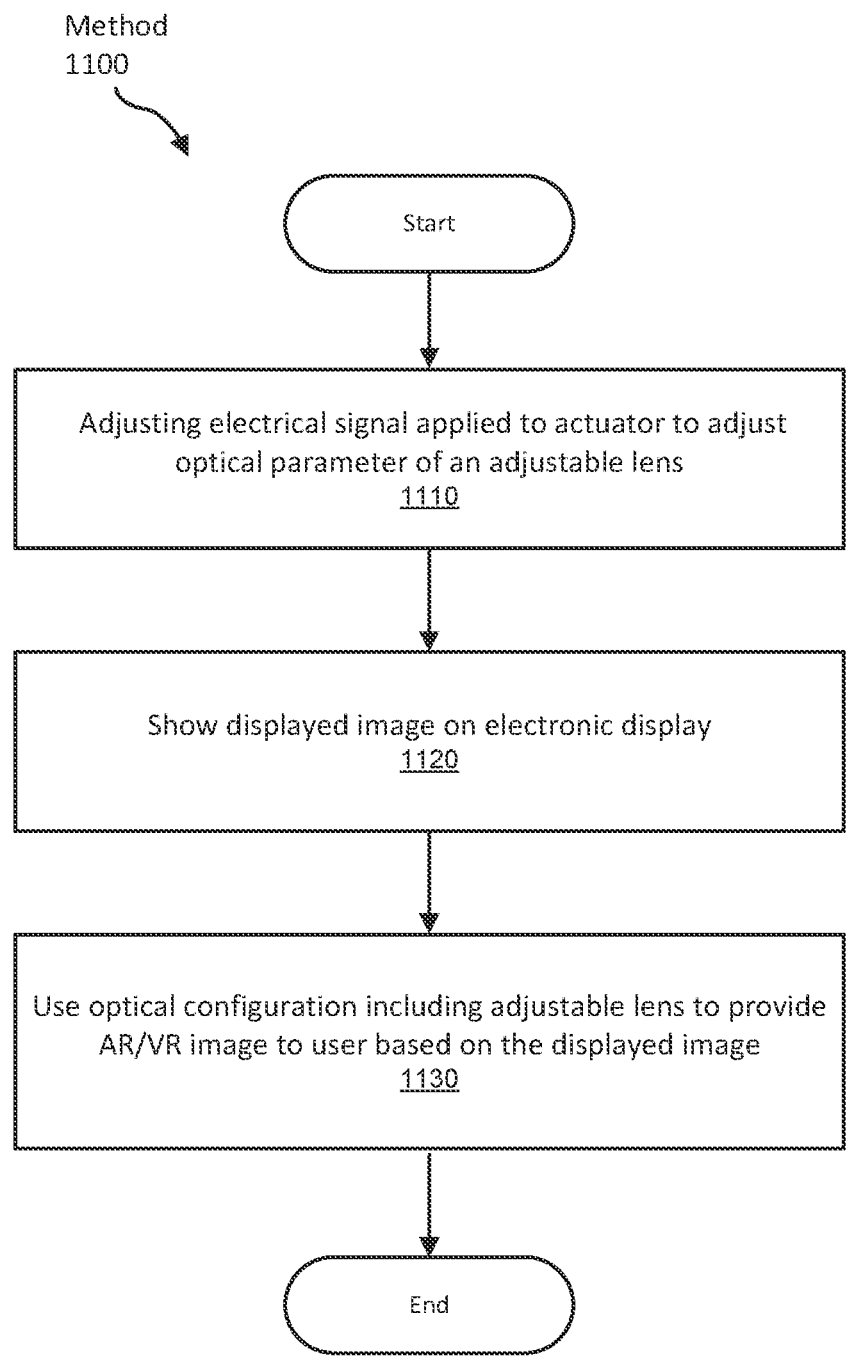
FIG. 11 shows a further example method in accordance with various embodiments.
Figure 12:
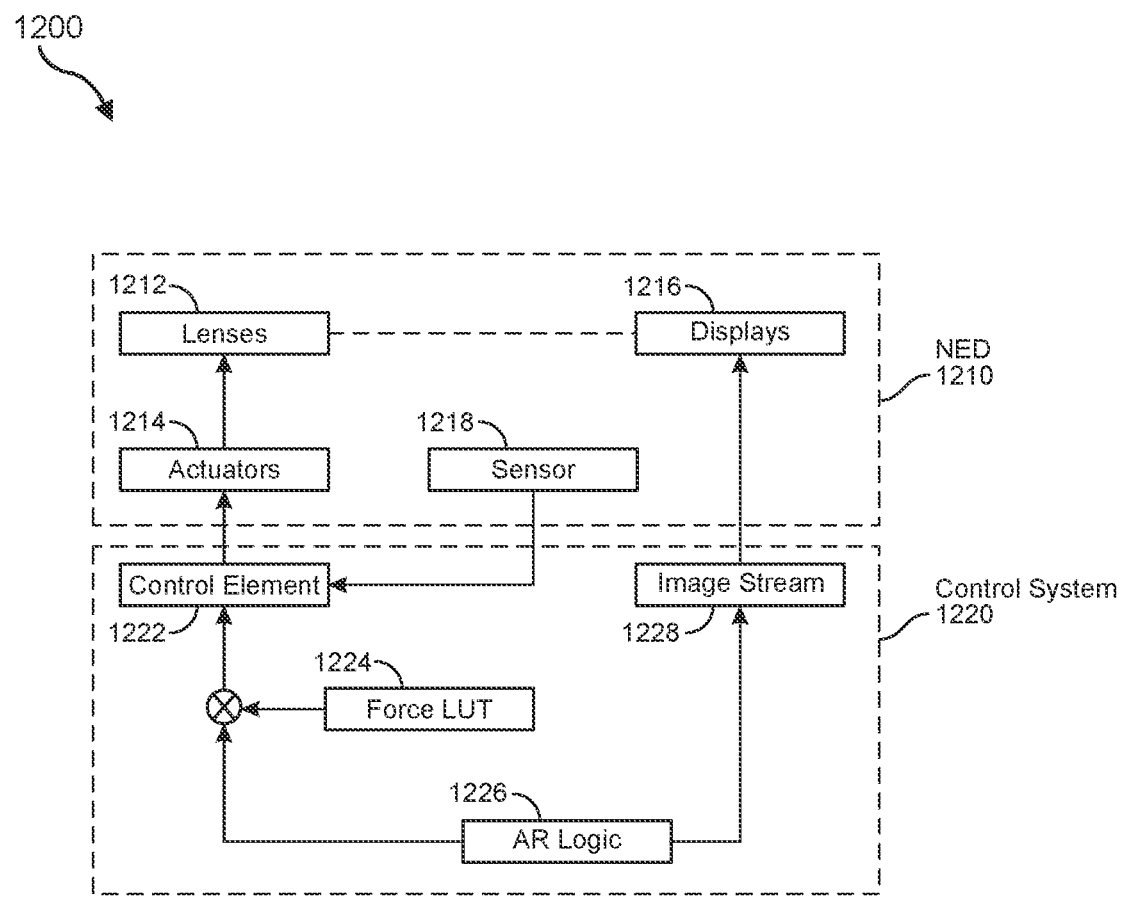
FIG. 12 shows a schematic of an example control system that may be used in connection with various embodiments.
Figure 13:
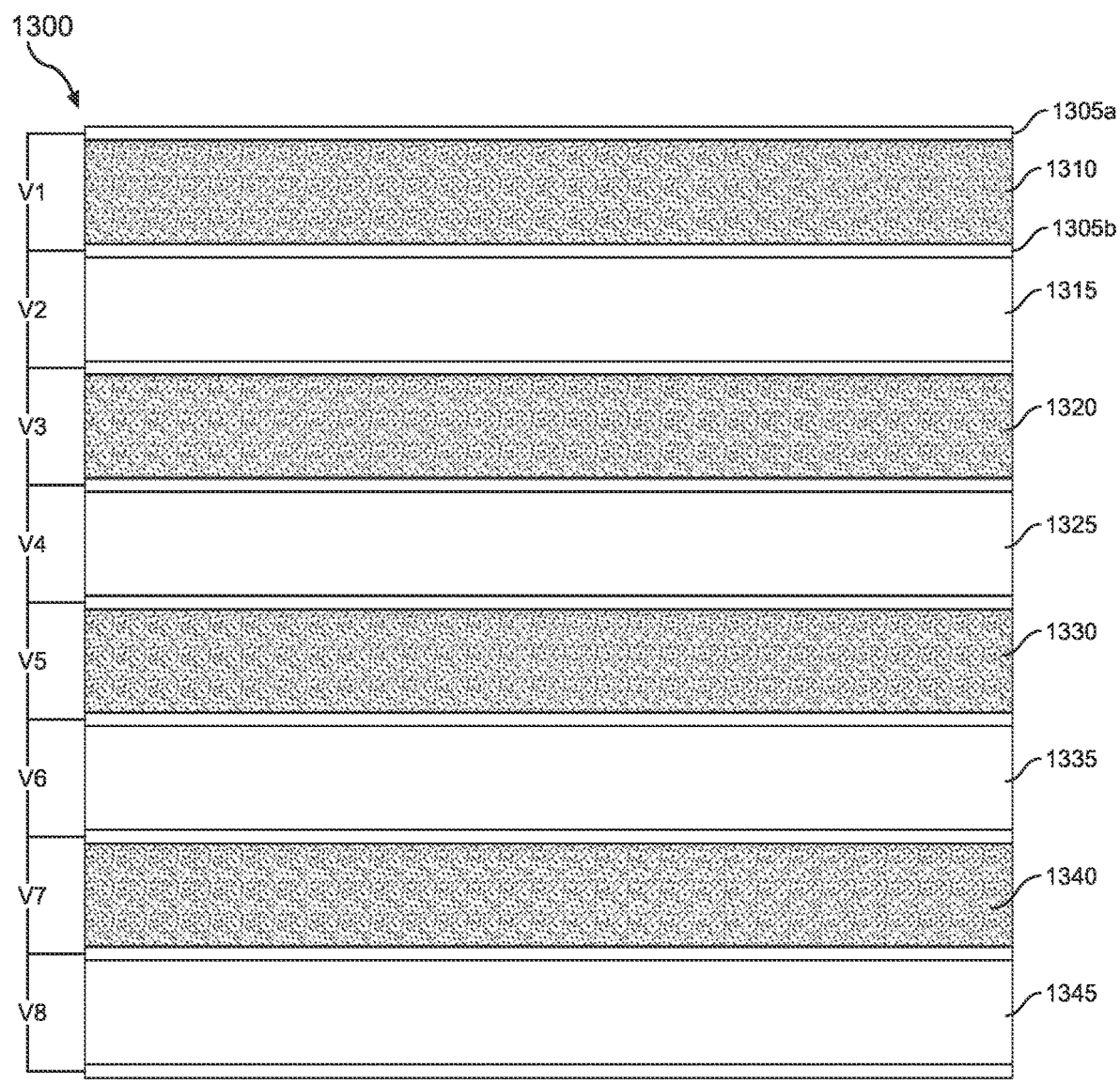
FIG. 13 shows a schematic of an example lens actuator that may be used in connection with various embodiments.
Figure 14:
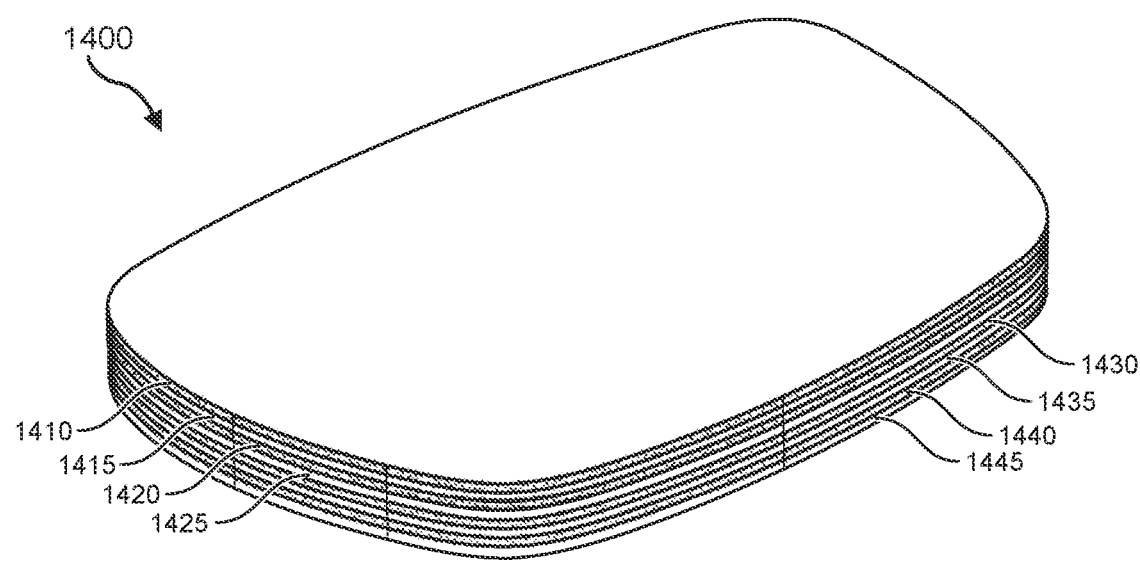
FIG. 14 is a perspective view of an optical element that may include an example stacked actuator according to some embodiments.
Figure 15:
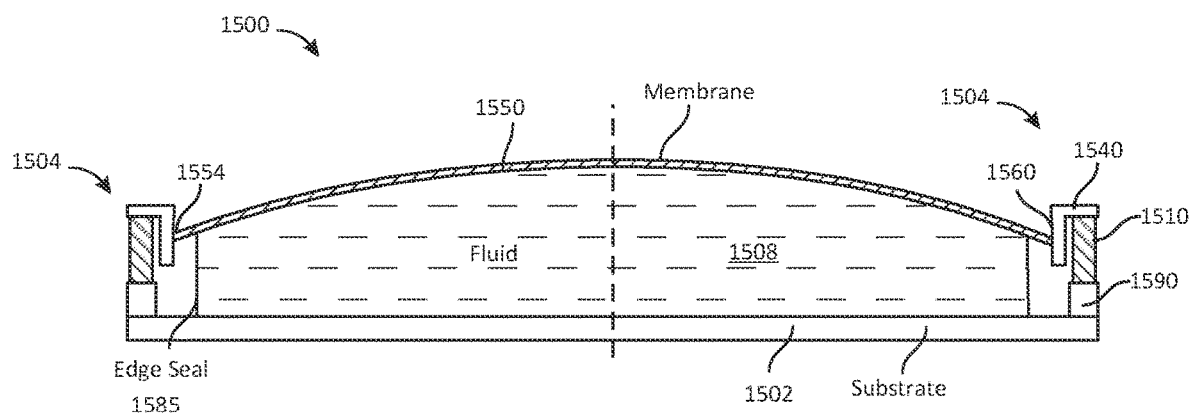
FIG. 15 is an illustration of an exemplary active fluid lens that may be used in connection with various embodiments.
Figure 16:
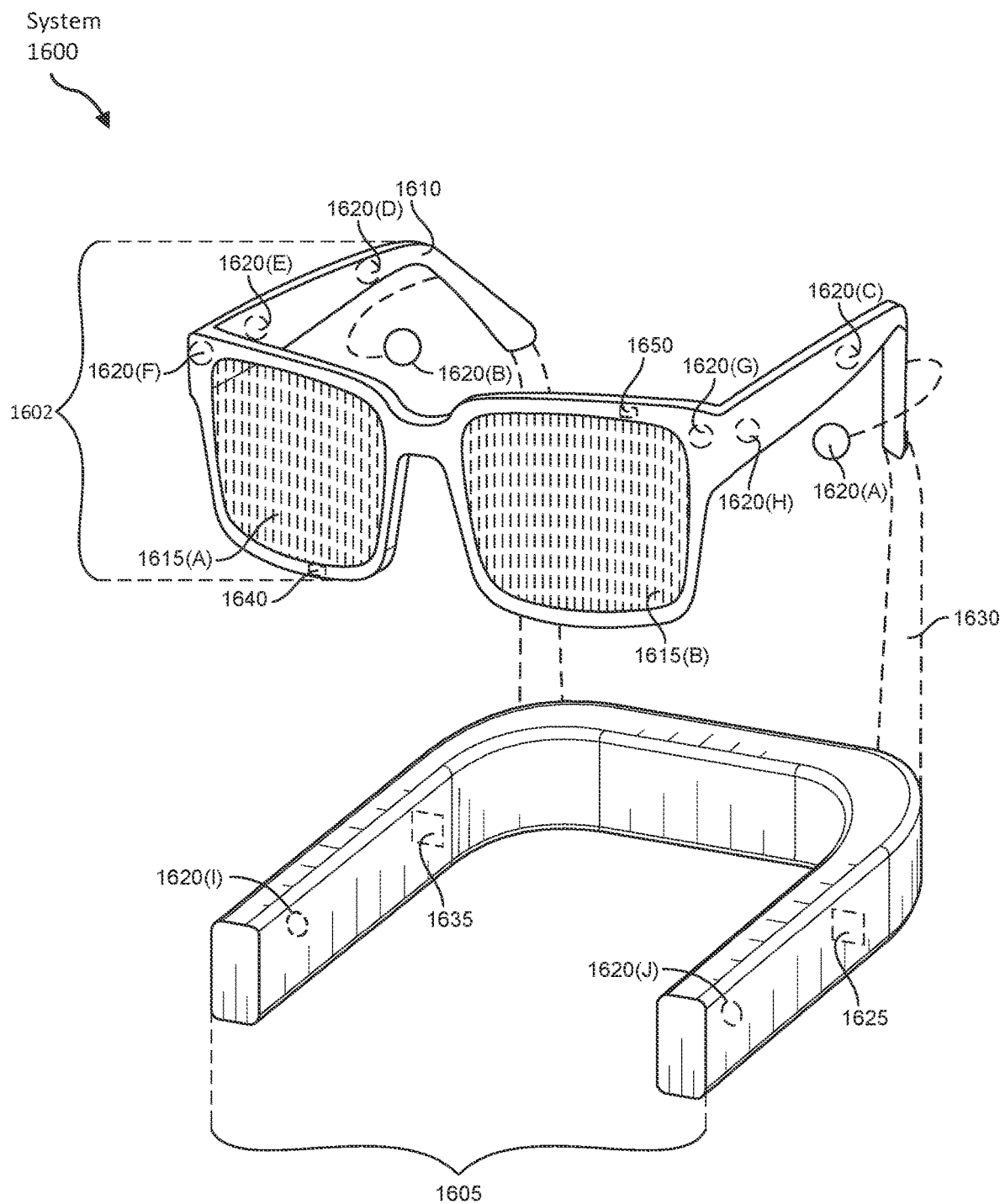
FIG. 16 is an illustration of exemplary augmented-reality glasses that may be used in connection with various embodiments.
Figure 17:
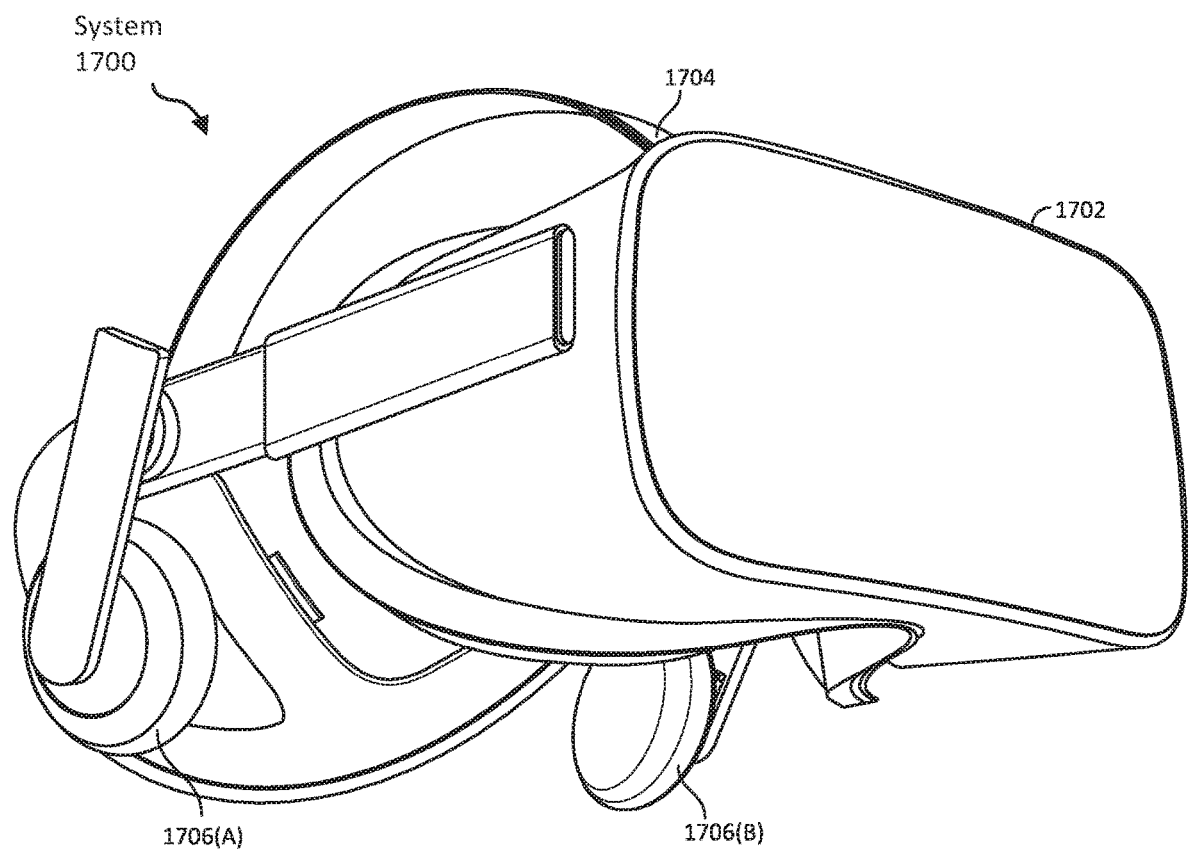
FIG. 17 is an illustration of an exemplary virtual-reality headset that may be used in connection with various embodiments.

The following provides, with reference to FIGS. 1-17, detailed descriptions of example embodiments. FIG. 1 shows an example optical configuration of a device in accordance with various embodiments. FIGS. 2 and 3 show light propagation through a cross section of an example lens assembly in accordance with various embodiments. FIGS. 4-6 are schematics of further example optical configurations. FIGS. 7 and 8 show example actuator configurations. FIGS. 9-11 show example methods in accordance with various embodiments. FIG. 12 shows a schematic of an example control system, FIGS. 13 and 14 show an example lens actuator that may be adjusted by an example control system and FIG. 15 shows an example active lens that may be adjusted by an actuator. FIGS. 16 and 17 illustrate exemplary augmented-reality and virtual-reality devices that may be used in connection with various embodiments.

FIG. 1 shows an example apparatus including a display and an optical configuration in accordance with various embodiments. The apparatus 100 includes a display 105, a first lens 115 including a partial reflector 120, a quarter wave plate 125, and a second lens 130 including a reflective polarizer 135 and an optional substrate 140 (e.g., a transparent substrate which may be provided by a lens). In some examples, the display 105 may emit circularly polarized light. Quarter wave plate 125 may be omitted if the reflective polarizer 135 includes a cholesteric reflective polarizer. An example light ray 110 may be emitted by the display 105 and partially transmitted by the partial reflector 120. Depending on the type of reflective polarizer 135 used in the display (e.g., with wire grid and birefringent multilayer reflective polarizers) a quarter wave plate 125 may be needed to convert a circularly polarized light ray 110 to a linearly polarized light ray 145. Light ray 145 may be reflected by the reflective polarizer 135 forming ray 150, which is reflected by the partial reflector 120 forming ray 155, where the ray is transmitted by the reflective polarizer 135, through the optional substrate 140, to form light ray 160 directed towards the user's eye (not shown, but may be to the right of the figure and located to receive the light ray emerging from the apparatus).

FIG. 2 shows an apparatus including a display and an optical configuration including a varifocal lens assembly in accordance with various embodiments. An apparatus 200 includes a display 205, a first lens assembly 215 and a second lens assembly 230. The first lens assembly 215 has a partial reflector 220 supported by one surface of a first lens and a quarter wave plate 225 supported on the opposite surface of the first lens. The second lens assembly 230 includes a reflective polarizer 232 on one surface of a second lens and an actuator 235 on the opposite surface of the second lens assembly. The first and second lens assemblies may each include a lens, such as a refractive lens. The actuator 235 may be a multilayer actuator, such as a multilayer actuator discussed in more detail below. The display 205 emits display light (sometimes more concisely referred to as light), illustrated by example ray bundles 210 that may form divergent ray bundles 240 and 245. The divergence of ray bundles 240 and 245 creates an image that appears closer to the user than the image created by the configuration discussed below in relation to FIG. 3. The distance of the image to the eye of a user may be referred to as the accommodation distance and the accommodation distance may be adjusted by controlling the actuator using one or more electrical signals.

In some examples, an adjustable lens in the second lens assembly 230 may have a radius of curvature of in the range of approximately flat to approximately 150 mm, such as approximately flat to approximately 50 mm.

FIG. 3 shows light propagation through a cross section of an apparatus 300 having an optical configuration in accordance with various embodiments. Example apparatus 300 includes a display 305, a first lens assembly 315 and a second lens assembly 330. The first lens assembly 315 may include a partial reflector 320 supported by one surface of a first lens and a quarter wave plate 325 supported by the opposite surface. The second lens assembly 330 may include a lens that supports a reflective polarizer 332 on one surface and an actuator 335 on the opposite surface. The display 305 may be configured to emit light, such as light ray bundles 310 that may form collimated ray bundles 340 and 345. The collimation of ray bundles 340 and 345 may create an image that appears at a far distance from the user.

In some examples, the second lens assembly 330 may include a lens, such as an adjustable lens, having a radius of curvature of in the range of approximately flat to approximately −150 mm, such as approximately flat to approximately −50 mm. In some examples, the optical power of the second lens assembly may be adjustable using actuator 335.

FIG. 4 is a schematic of an example optical configuration including at least one lens having an adjustable optical power in accordance with various embodiments. For illustrative clarity, lens assemblies 470 and 475 are shown as being flat, but this is not limiting. Apparatus 400 may include display 405 and an optical configuration including a first lens assembly 470 and a second lens assembly 475. The first lens assembly 470 may include an actuator 410 (e.g., a transparent multilayer actuator), a reflector 415 (e.g., a partial reflector, beamsplitter or reflective polarizer layer) and an optional quarter wave plate 420. The second lens assembly 475 may include a reflective polarizer 425, and a second lens 430 including an actuator supported on a surface of the second lens. Display 405 may be configured to emit light ray 450, which may be partially transmitted by first lens assembly 470 forming ray 455 that may then be at least partially reflected by second lens assembly 475 to form ray 460, which then may be at least partially reflected by the reflector 415 of the first lens assembly 470 to form ray 465, which may then be at least partially transmitted by second lens assembly 475, for example, towards the eye of a user when the user wears the apparatus. In some examples, display 405 may emit an unpolarized light ray 450.

In some examples, actuator 410 may include one or more actuator layers including a piezoelectric material, for example, a transparent piezoelectric layer including a piezoelectric material such as a crystal or ceramic material. Example piezoelectric materials include PMN-PT (lead magnesium niobate-lead titanate) and other materials. An actuator layer may include a suitable transparent electrode structure, such as a pair of electrodes configured to apply an electric potential determined by a controller. In some examples, an actuator may include a laminated structure including one or more piezoelectric materials and optionally one or more passive (effectively non-piezoelectric) materials such as glass. In some examples, an actuator may include a transparent unimorph actuator which may optionally be laminated with a passive layer.

In some examples, optional quarter wave plate 420 may be configured to converts circularly polarized light (e.g., light transmitted by the reflector 415 of first lens assembly 470) to linearly polarized light. The linearly polarized light may be reflected by a linear polarization reflective polarizer and the actuator (e.g., a unimorph actuator), such as an actuator supported by second lens 430.

In some examples, an example apparatus may include a display and at least one lens assembly. An example lens assembly may be generally flat and may include, for example, a fluid lens, a diffractive component or a Fresnel lens, or both, in one or both lens assemblies. However, examples are not limited to flat lens assemblies and example apparatus may include one or more lenses each having one or more curved surfaces. In some examples, at least one of first and second lens assemblies may have an adjustable optical parameter, such as optical power and/or cylindricity. For example, at least one of first and second lens assemblies may include a surface having a controllable curvature, for example, a membrane of a fluid lens, a curved surface of an electrically controllable electrooptical solid lens, or an actuator-controlled lens including an elastic material (e.g., a Fresnel lens or other refractive lens including an elastomer component).

In some examples, a partially reflective layer may include one or more of three layers, for example, an absorbing linear polarizer, a quarter wave plate and a partial reflector layer. An example partial reflector layer may include a thin metal (e.g., silver) layer. A partial reflector layer may be configured to reflect about 50% of light and transmit about 50% of light, for example, for at least one wavelength of visible light.

FIG. 5 is a schematic of an apparatus 500 including an example optical configuration including at least one lens having an adjustable optical power and an absorbing optical polarizer, in accordance with various embodiments. Apparatus 500 may include a display 505, a first lens assembly 570 and a second lens assembly 575. The first lens assembly 570 may include a actuator 510 (e.g., a transparent actuator such as a transparent multilayer actuator), a reflector 515 (e.g., a partial reflector, beamsplitter or reflective polarizer) and a first lens 520 that may further support an optional quarter wave plate. The second lens assembly 575 may include reflective polarizer 525, a combination of a second lens and absorbing polarizer 535 and a second actuator 530. In some examples, the second actuator may be omitted.

Display 505 may be configured to emit ray 550, which may be partially transmitted by first lens assembly 570 forming ray 555 that may then be at least partially reflected by second lens assembly 575 to form ray 560, which then may be at least partially reflected by reflector 515 of the first lens assembly 570 to form ray 565, which may then be at least partially transmitted by second lens assembly 575, for example, towards the eye of a user. In some examples, display 505 may emit an unpolarized light ray 550.

The optical configuration of FIG. 5 may be modified (relative to the optical configuration of FIG. 4) to reduce reflection from, for example, objects outside of the apparatus such as the user's face (not shown). In this example, lens 575 supports an absorbing polarizer 535, where the blocked polarization of the absorbing polarizer 535 may be parallel with the blocked polarization of reflective polarizer 525 to reduce reflection effects.

FIG. 6 is a schematic of a further example apparatus 600 including an optical configuration having at least one lens with an adjustable optical power and at least one actuator, in accordance with various embodiments. Apparatus 600 includes display 605, first lens assembly 670 and second lens assembly 675. The first lens assembly 670 may include an actuator 610 (e.g., a transparent actuator such as a transparent multilayer actuator), a reflector 615 (e.g., a partial reflector or reflective polarizer layer), an optional quarter wave plate 620, a partial reflector 625, and first lens 630. The second lens assembly 675 may include a reflective polarizer 635 located on a surface of a second lens 640 and a second actuator 645 located on the opposite surface of the second lens 640. The second lens assembly may also include an absorbing polarizer as discussed in more detail below. For example, second lens 640 may support an optional absorbing polarizer layer that may absorb any light polarization blocked by the reflective polarizer 635. The second actuator 645 may be a unimorph or bimorph actuator and in some examples may be omitted. In this and other examples, the order of optical elements within a lens assembly may be reversed and/or rearranged. In some examples, the display 605 may be configured to emit unpolarized light. In some examples, the display 605 may include an OLED (organic light-emitting diode) display.

A light ray 650, such as an unpolarized light ray, may pass through the first lens assembly 670, including actuator 610. The actuator 610 may include a transparent multilayer structure including a plurality of electroactive layers and an arrangement of transparent electrodes configured to apply electrical signals to the electroactive layers. In some examples, a controller may be used to provide an adjustable electrical signal to at least one layer of a multilayer actuator. Actuator 610 may be a unimorph or bimorph actuator. In some examples, the light ray 650 may pass through the reflector 615 and through the quarter wave plate 620 to form circularly polarized light. For example, the reflector 615 may include a linear polarizer. The light ray 650 passes through the first lens assembly, including the partial reflector 625 and first lens 630, to provide light ray 655. The first lens may support an optical retarder such as the quarter wave plate 620. Light ray 655 may then be reflected by second lens assembly 675 to form light ray 660, and then may be reflected as light ray 665 back through the second lens assembly towards, for example, an eye of the user when the user wears the apparatus.

The designation of first lens assembly and second lens assembly may be arbitrary. In some examples, an apparatus may be configured so that the display light passes through the first lens assembly, is reflected by the second reflector of the second lens assembly, is reflected by the first reflector of the first lens assembly, and then passes through the second lens assembly to the eye of a user. In some examples, the apparatus may be configured so that the display light passes through the second lens assembly, is reflected by the first reflector of the first lens assembly, is reflected by the second reflector of the second lens assembly, and then passes through the first lens assembly to the eye of a user. An actuator may be associated with the first lens assembly, a second lens assembly, the lens assembly closest to the eye, the lens assembly closes to the display, or with a plurality of (e.g., two) lens assemblies. The actuator may be used to adjust an adjustable lens within the respective lens assembly. In some examples, at least one actuator may be combined with one or more optical elements in an example lens assembly, such as an adjustable lens or other optical element. A lens assembly including an actuator may be referred to as a first lens assembly, and a second lens assembly may include an actuator and an adjustable lens, or not include an actuator.

In some examples, an actuator may change the polarization state of light transmitted through the actuator, and this may be included in the optical design of the optical configuration.

FIG. 7 shows an example actuator 700 having an actuator configuration that may not substantially change the degree of polarization of light transmitted through the actuator 700, even for an actuator having a layer of high birefringence (e.g., a birefringence of at least 0.01). In some examples, the approach may use the quantum Zeno effect. Actuator 700 may include a clocked stack of birefringent actuator layers.

Actuator 700 is shown having nine actuator layers, though the number of actuator layers is not restricted to this example. For example, an example actuator may include 1-50 layers, such as 1-20 layers, or other number of layers. First actuator layer through ninth actuator layer are indicated as actuator layers 715, 720, 725, 730, 735, 740, 745, 750 and 755 respectively, where each actuator layer has a high in-plane index $n_x$, a low in-plane index $n_y$, and an refractive index orthogonal to the in-plane indices (orthogonal component) $n_z$. The orthogonal component $n_z$ may have a lower value than $n_y$, be higher than $n_x$, or be between $n_x$ and $n_y$. In some examples, $n_z$ has a value very close to either $n_x$ or $n_y$. The figure shows $n_x$ as clocked vectors, such as the clocked vectors denoted 705, 710 and 760.

In this context, a clocked stack of layers may include a multilayer structure including birefringent layers, each layer having an optic axis direction within the plane of the respective layer that has an angular step difference from the optic axis direction of at least one neighboring layer. In some examples, layer optic axis directions may rotate in a stepped manner around a direction normal to the layers. Layer optic axis directions may describe a circle (e.g., 360 degrees rotation) progressing through the multilayer structure. In some examples, the approximate helicoid structure provided by the rotation of the optic axis directions may provide a waveguiding effect. In some examples, optical effects due to birefringence of one layer may be cancelled out by optical effects due to other layers having different optic axis directions. Layers may include an oriented piezoelectric material, such as materials discussed in more detail below. An example layer may include uniaxially oriented PVDF (sometimes referred to as polyvinylidene fluoride or polyvinylidene difluoride). An example actuator may provide control of spherical, cylindrical, and optical axis parameters (e.g., optical power, cylinder, and axis location and direction respectively). In some examples, a multilayer actuator may include a plurality of electroactive layers (e.g., piezoelectric layers) interleaved with electrode layers. In some examples, a multilayer actuator may include a plurality of electroactive layers interleaved with non-electroactive layers, and non-electroactive layers may support electrode layers on one or both sides thereof.

FIG. 8 shows an example actuator 800 having a simplified configuration relative to the actuator of FIG. 7 discussed above, in accordance with various embodiments. Actuator

800 may include two uniaxial actuator layers 850 and 855, where the $n_x$ vectors for each layer are approximately orthogonal to each other, as shown using arrow 830 and arrow 860 (e.g., that may represent optic axis directions).

Actuator 800 may be configured to reduce or substantially eliminate birefringence effects on the polarization of light transmitted through the actuator. In some examples, a plurality of actuator layers (e.g., at least two layers) includes two birefringent layers having orthogonal optic axes, where the optic axis of each layer may lie in the plane of the respective layer. In some examples, the actuator 800 may have a multilayer structure in which individual actuator layers may provide separately controllable uniaxial forces. Example piezoelectric materials that may be used in piezoelectric actuators are described in more detail below. A birefringent layer may be an optically uniaxial layer. A plurality of actuator layers may include a plurality of uniaxial layers, where each uniaxial layer has an optic axis and an orientation of the optic axis within the plane of each uniaxial layer may differ from that of a neighboring uniaxial layer by at least 10 degrees. In this context, neighboring electroactive layers may be separated by a non-electroactive layer, but are otherwise adjacent. In this context, a non-electroactive layer may not, for example, be capable of changing the optical power of the lens assembly by any perceptible degree in response to electrical signals provided to the actuator during normal operation. In some examples, this may correspond to an optical power change of less than 0.1, such as less than 0.01. An electroactive actuator layer may include a piezoelectric material or other material that provides a mechanical change in response to an applied electrical signal. In some examples, an actuator may include a plurality of actuator layers including an alternating arrangement of piezoelectric layers and non-piezoelectric layers, where the non-piezoelectric layers may include non-electroactive dielectric layers and/or electrode layers.

Example ceramic piezoelectric actuator materials that may be used in an example actuator may include; lead magnesium niobium oxide, lead zinc niobium oxide, lead scandium tantalum oxide, lead lanthanum zirconium titanium oxide, barium titanium zirconium oxide, barium titanium tin oxide, lead magnesium titanium oxide, lead scandium niobium oxide, lead indium niobium oxide, lead indium tantalum oxide, lead iron niobium oxide, lead iron tantalum oxide, lead zinc tantalum oxide, lead iron tungsten oxide, barium strontium titanium oxide, barium zirconium oxide, bismuth magnesium niobium oxide, bismuth magnesium tantalum oxide, bismuth zinc niobium oxide, bismuth zinc tantalum oxide, lead ytterbium niobium oxide, lead ytterbium tantalum oxide, strontium titanium oxide, bismuth titanium oxide, calcium titanium oxide, lead magnesium niobium titanium oxide, lead magnesium niobium titanium zirconium oxide, lead zinc niobium titanium oxide, lead zinc niobium titanium zirconium oxide as well as any of the previous mixed with any of the previous and/or traditional ferroelectrics including lead titanium oxide, lead zirconium titanium oxide, barium titanium oxide, bismuth iron oxide, sodium bismuth titanium oxide, lithium tantalum oxide, sodium potassium niobium oxide and lithium niobium oxide. Examples further include lead titanate, lead zirconate, lead zirconate titanate, lead magnesium niobate, lead magnesium niobate-lead titanate, lead zinc niobate, lead zinc niobate-lead titanate, lead magnesium tantalate, lead indium niobate, lead indium tantalate, barium titanate, lithium niobate, potassium niobate, sodium potassium niobate, bismuth sodium titanate, or bismuth ferrite.

In some examples, an actuator may include at least one layer including a piezoelectric polymer, such as a piezoelectric fluoropolymer. Example fluoropolymers may include PVDF and analogs, derivatives, copolymers, blends and composites thereof, such as a copolymer of PVDF, for example, PVDF-TrFE (poly(vinylidene fluoride-co-trifluoroethylene) or PVDF-TrFE-CTFE (poly(vinylidene fluoride-trifluoroethylene-chlorotrifluoroethylene terpolymer). In this context, a copolymer may include terpolymers and the like. In some examples, at least one layer of an actuator may include an oriented piezoelectric polymer such as an oriented fluoropolymer, for example, a poled fluoropolymer or mechanically aligned fluoropolymer. In some examples, an actuator may include at least one layer including an electrostrictive polymer such as at least one polyacrylate and/or at least one silicone elastomer, such as polydimethylsiloxane (PDMS). In some examples, an electrostrictive polymer such as PDMS may have a low value of birefringence and may be used without additional layers for polarization control. In this context, a low value of birefringence may be approximately equal to or less than 0.05, such as approximately equal to or less than 0.01.

In some examples, an electric field (e.g., a voltage) applied across one or more actuator layers may induce an electrostriction of the actuator layer, for example, in a direction parallel to or orthogonal to the electric field. In some examples, electrostriction within one or more actuator layers may be used to adjust the curvature of a membrane and hence, for example, the optical power of an adjustable fluid lens. In some examples, electrostriction within one or more actuator layers may be used to adjust an optical power and/or a cylindricity of an adjustable fluid lens (e.g., an adjustable liquid lens). In some examples, a symmetrical arrangement of electrostriction effects may be used to adjust optical power. In some examples, an asymmetrical arrangement of electrostriction effects may be used to obtain non-spherical optical parameter adjustments such as adjustment of cylindricity.

FIG. 9 illustrates an example method 900 including: emitting light from a display (910); transmitting the light through a first lens assembly (920); reflecting the light from a second lens assembly (930); reflecting the light from the first lens assembly so that the light passes through the second lens assembly (940); and adjusting an optical power of the first lens assembly using an actuator (950). In some examples, transmitting the light through a first lens assembly may include transmitting the light through the actuator. The actuator may include a plurality of layers including at least one birefringent layer. In some examples, a controller may adjust at least one electrical signal provided to the actuator to adjust an optical parameter of the lens, such as optical power.

FIG. 10 illustrates an example method 1000 including: fabricating a lens assembly including an adjustable lens (1010); attaching an actuator (e.g., an actuator including a plurality of actuator layers) to the adjustable lens (1020); and adjusting an optical parameter of the adjustable lens using the actuator (1030). In some examples, the adjustable lens may include an elastic membrane and the actuator may be disposed on (or incorporated into) the elastic membrane. For example, the adjustable lens may be a fluid lens, such as a liquid lens. An example fluid lens may include a fluid located within an enclosure at least partially defined by the membrane.

FIG. 11 illustrates an example method 1100 including: using a controller, adjusting at least one electrical signal applied to an actuator to adjust an optical parameter (e.g., an optical power) of an adjustable lens, such as an adjustable fluid lens (1110); showing a displayed image on an electronic display (1120); and using an optical configuration including the adjustable fluid lens to provide an augmented reality or virtual reality image to a user based on the displayed image (1130).

Optical configurations including one or more pancake lenses may be used in various applications, such as AR/VR applications, cameras, projection apparatus and other optical systems. Applications may require accommodation during operation and hence require a way to change the focal length of the optical configuration. In many cases, the rate of focal length change may be fast, for example, less than 1 second, or less than or approximately equal to 200 ms, and may be both compact and lightweight. Examples may provide one or more of such features where, for example, the response time of the actuators may be on the order of milliseconds or less. In some examples, the change in focal length provided by the actuator may range from 1 diopter to 5 diopters (or greater than 5 diopters), and variable cylinder and/or axis may be provided using appropriate electrical signals provided to the actuator. For example, the controller may determine a desired image distance from the eye of a user (e.g., measured from the front of the cornea, or from the display), determine electrical signals to provide a desired focal length of the adjustable lens, and provide the appropriate electrical signals to the actuator to obtain, for example, a curved surface appropriate for the desired image distance.

Compact optical systems may be useful for head-mounted displays, including virtual and augmented reality apparatus. Varifocal operation may be useful for user comfort and experience. A varifocal lens may be an edge-driven lens, where the curvature is, for example, controlled by an actuator located near the edge of the lens, where the actuator may apply a bending force that controls the curvature of the lens. Substantial force may be required for this mode of operation, and the actuator motion may be complicated, possibly increasing space and power requirements and increasing both the actuator and lens weight. Further, adding actuators to the optical configuration may cause stray light issues. However, in some examples, stray light may be reduced by maintaining a high degree of light polarization. In this context, a high degree of light polarization may correspond to a polarization ratio of at least approximately 10:1, such as at least approximately 20:1.

Examples include optical configurations including at least one lens having variable accommodation. Examples include relatively compact lenses (e.g., compared to lenses having edge-driven actuators), lenses with a wide accommodation range, and lenses with cylinder adjustment. In some examples, an optical configuration including at least one varifocal lens, having an optical power that may be adjusted using a controller, may provide prescription lens correction for a user (e.g., for real world images) and/or may allow adjustment of the eye accommodation appropriate for a user to view an augmented or virtual image element.

In some examples, an apparatus may include a first lens assembly including a first lens, a reflector, and an actuator layer. The reflector may include a polarizing reflector, beam splitter or other reflector. An apparatus may further include a second lens assembly including a second lens and a second reflector, such as a polarizing reflector, beam splitter, or other reflector. In some examples, the second lens assembly may include a second lens, a second reflector (e.g., a beam splitter or reflective polarizer). In some examples, the second lens may include a reflector and an absorbing polarizer.

For example, the second reflector may provide an approximately 50%/50% (reflected %/transmitted %) beam splitter. However, this ratio is not limiting and the reflected intensity percentage may range from 30% to 70%, with the transmitted percentage correspondingly ranging from 70% to 30%, neglecting absorption losses.

In some examples, a reflector may include a beam splitter In some examples, a beam splitter may include a thin metal coating, where the metal may include silver, gold, aluminum, other metal (e.g., other transition metal or non-transition metal), or any combination of metals such as an alloy. In some examples, the beamsplitter may include a dielectric layer, a dielectric multilayer, or polymer, such as a polymer layer having a silver appearance. For example, the beam splitter may include a dielectric single or multiple layer, or a combination of any approaches or materials described herein (e.g., a combination of one or more metal layers, dielectric layers, and/or other layers).

In some examples, an apparatus includes: a first lens assembly including a first reflective layer; and a second lens assembly including a reflective layer and a third layer (e.g., an actuator layer).

Regarding the second lens assembly, the reflective layer may include a reflective polarizer. In some examples, an absorbing polarizer layer may be adjacent and between the reflective layer and the third layer, and the polarization axis of the absorbing polarizer layer may be parallel to the polarization axis of the reflective layer. The reflective layer may be an approximately 50%/50% beam splitter. The beam splitter may include a thin metal coating on a substrate, such as a silver layer or aluminum layer on a glass or polymer substrate. The beam splitter may include a single dielectric layer or a multilayer structure such as a dielectric multilayer. In some examples, a beamsplitter may include a combination of one or more metal layers and one or more dielectric layers.

In some examples, the first lens assembly and/or the second lens assembly may each include at least one Fresnel lens. In some examples, a reflector may include a layer coated on the surface of a Fresnel lens. For example, a reflective polarizer may be supported on a planar or faceted surface of a Fresnel lens.

In some examples, a method of controlling the apparent distance of an image for a user includes: determining the desired viewing distance of an image; and applying a voltage to a transparent actuator in at least one lens making up the pancake lens to control the curvature of the lens. In some examples, the control of the curvature of the lens may use an open loop system. In some examples, a controller may provide at least one electrical signal to corresponding at least one pair of electrodes to independently control a plurality of actuator layers. In some examples, the control of the curvature of the lens may use a closed loop feedback system where the curvature or a parameter based on the curvature (e.g., optical power) may be determined by a sensor (e.g., a capacitance sensor or an optical sensor such as an image and/or focus sensor). For example, a sensor may determine the curvature of the lens, and the voltage is controlled or adjusted based on the sensor measurement.

In some examples, a controlled birefringence actuator includes a first actuator layer and at least a second actuator layer, where the first and second layers have a high refractive index axis, and the orientation of the first and second layer are perpendicular to each other. For example, each actuator layer may be birefringent and have an optic axis parallel to the plane of the layer. For curved actuator layers, the local optic axis may be within the local plane of the layer. An actuator may include (e.g., have only) two actuator layers, where the optic axes of the pair of layers may be orthogonal to each other and may both be within the plane of the respective layers. In some examples, an actuator may include a stack of 3 or more actuator layers, where the orientation of each layer is clocked. In this context, clocked orientations may refer to actuator layers in which the optic axis (and/or direction of maximum actuation) for each layer may have an angular offset from that of an adjacent or neighboring layer. For example, the optic axes of a plurality of layers may rotate in angular increments around a direction generally orthogonal to the layers. The optic axes may generally describe a stepped spiral around the direction generally orthogonal to the layers. In some examples, an actuator may include at least 5 actuator layers and the orientation of each layer is clocked.

In some examples, at least one lens assembly may include an active lens, such as a lens assembly including an actuator layer that is transparent and can be electronically energized causing a change in the curvature of the lens. In some examples, the optical configuration may be described as a pancake lens, for example, an imaging lens having a first and a second partially reflective and partially transparent lens surfaces, where one of the surfaces may be a partial reflector, and the other surface may be a reflective polarizer.

Examples include a lens assembly including an actuator. In some examples, an actuator may include a unimorph and/or a bimorph actuator. A unimorph actuator may include an electroactive layer where applying an electric field to the electroactive layer creates a mechanical force in the plane of the electroactive layer, and a passive layer such as a polymer film, such as an acrylate polymer film such as PMMA (polymethylmethacrylate). A bimorph actuator may include a first electroactive layer bonded to a second electroactive layer, optionally with a passive layer located between the first and second electroactive layers. In some examples, an actuator may have a multilayer structure and the orientation of the layers may be clocked. In this context, clocked layers may refer to the direction of highest refractive index being rotated in an approximately uniform degree between neighboring actuator layers. For example, a 3 layer stack may have the orientation of the first, second, and third layers oriented (e.g., in plane) at 0°, 60°, and 120°. In some examples, the angular offset (e.g., in-plane angular offset) between successive birefringent layers (e.g., neighboring or adjacent layers, progressing though the stack) may be 360/N degrees, where N is the number of actuator layers in the actuator or a portion thereof.

In some examples, an AR/VR device may include a display and a lens with variable accommodation. The lens may be a pancake lens that folds the light path back on itself to reduce the device dimensions. The device may include a display and a liquid lens having a transparent actuator layer that may be configured to control the optical power of the lens. The device may also include a beamsplitter and a polarized reflector. The actuator layer may include at least one birefringent layer (having different refractive indices in different directions, e.g., different directions within the plane of the layer) and this may cause unwanted optical effects if the display emits polarized light. In some approaches, these effects may be avoided using a display that emits unpolarized light and polarizing the light after it passes through the actuator layer. In some approaches, linearly polarized light from a display may be aligned with an optical axis of the actuator layer and an optical retarder may be used to compensate for any unwanted optical effects. In further approaches, multiple actuator layers may be stacked and arranged so that the exit light has the same polarization as the input light. For example, birefringent layers may have a clocked multilayer arrangement in which the optic axis rotates around 360 degrees through a plurality of stepped changes in direction, where the angular step between neighboring layers may be at least 10 degrees and may be (at least approximately) equal steps. In some examples, actuators may include polymers with low birefringence that may greatly reduce unwanted optical effects. In some examples, devices may also include an optically absorbing layer to reduce reflections from the user's eye entering the optical system. For example, a lens assembly (e.g., a lens assembly closer to the eye) may include an absorbing polarizer.

In some examples, a method may include emitting light (e.g., including one or more light rays) from a display, transmitting the light through a first lens assembly, reflecting the light from a second lens assembly, and reflecting the light from the first lens assembly through the second lens assembly and towards an eyebox, for example, where a user may view an image of the display when the user wears the device. One or both lens assemblies may include a Fresnel lens. One or both lens assemblies may include an adjustable lens. The eye of a user may be located at the eyebox (e.g., a location of display image formation) for viewing the image of the display. The first lens assembly may include a first lens and a first reflective polarizer. The second lens assembly may include a second lens and a second reflective polarizer. In some examples, a method may further include adjusting at least one optical parameter (e.g., optical power and/or cylinder adjustments) of at least one lens assembly.

In some examples, an optical retarder may be located between the first and second lens assemblies, and the light from the display may pass through the optical retarder on a plurality of occasions (e.g., three times) before being transmitted through the second lens assembly towards the eye of the user. In some examples, light may be emitted from the display with a polarization, such as a linear polarization or a circular polarization. The polarization may be modified by the optical retarder each time the light passes through the optical retarder. Reflections may also modify the polarization of light. For example, light (e.g., polarized light) from the display may be transmitted through the first lens assembly, pass through the optical retarder, be reflected by the second lens assembly, pass through the optical retarder, be reflected by the first lens assembly, pass through the optical retarder, and then be transmitted by the second lens assembly towards the eye of a user, where the light may be incident on the reflective polarizer with a first linear polarization, which may be reflected by the reflective polarizer of the second lens assembly. Light may reflect from the reflective polarizer of the first lens assembly and may then be transmitted by the reflective polarizer. In some examples, at least one of the lens assemblies may include an optical retarder and the separate optical retarder may be omitted from the optical configuration. In some examples, a method may further include adjusting at least one optical parameter (e.g., optical power and/or cylinder adjustments) of at least one lens assembly.

In some examples, the image brightness provided by the display (e.g., including a display panel) using an optical configuration may include spatially adjusting the spatial profile of the illumination brightness of a light source (e.g., a backlight) and/or an emissive display. Display brightness may be adjusted as a function of one or more display parameters, such as spatial position on the display (e.g., spatial variations in image brightness), power consumption, aging effects, eye response functions, and/or other parameter(s).

In some examples, a method may include emitting light having circular or linear polarization from a display; transmitting the light through a first lens assembly; reflecting the light from a second lens assembly; and reflecting the light from the first lens assembly through the second lens assembly and towards an eye of a user. The apparatus may be configured so that the light is transmitted through the first lens assembly having a first polarization and reflected by the first lens assembly having a second polarization. This may be achieved using an optical retarder located between the first and second lens assemblies and/or using changes in polarization on reflection. A display may inherently emit polarized light or, in some examples, a suitable polarizer may be associated with (e.g., attached to) a surface through which light from the display is transmitted. In some examples, a method may further include adjusting at least one optical parameter (e.g., optical power and/or cylinder adjustments) of at least one lens assembly.

Example methods include computer-implemented methods for operating an apparatus, such as an apparatus as described herein such as a head-mounted display or an apparatus for fabricating a lens assembly. The steps of an example method may be performed by any suitable computer-executable code and/or computing system, including an apparatus such as an augmented reality and/or virtual reality system. In some examples, one or more of the steps of an example method may represent an algorithm whose structure includes and/or may be represented by multiple sub-steps. In some examples, a method for providing a uniform image brightness from a display using a folded optic configuration may include using a display panel that is configured to allow a spatial variation of the display brightness. In this context, light from a display may be reflected at least once (e.g., twice) within a folded optic configuration before reaching the eye of a user. In some examples, a method may further include adjusting at least one optical parameter (e.g., optical power and/or cylinder adjustments) of at least one lens assembly.

In some examples, an apparatus, such as a head-mounted device or system, may include at least one physical processor and physical memory including computer-executable instructions that, when executed by the physical processor, cause the physical processor to generate an image on the display. The image may include a virtual reality image element and/or an augmented reality image element. The apparatus may include an optical configuration such as described herein. A controller may include the at least one physical processor. The controller may be configured to adjust at least one optical parameter (e.g., optical power and/or cylinder adjustments) of at least one lens assembly. A head-mounted device may be an augmented reality device, a virtual reality device, or other device.

In some examples, a non-transitory computer-readable medium may include one or more computer-executable instructions that, when executed by at least one processor of an apparatus (e.g., a head-mounted device), cause the apparatus to provide an augmented reality image or a virtual reality image to the user (e.g., the wearer of the head-mounted device). The apparatus may include an optical configuration such as described herein. A controller may include the at least one physical processor. The controller may be configured to adjust at least one optical parameter (e.g., optical power and/or cylinder adjustments) of at least one lens assembly, for example, by adjusting at least one electrical signal applied to a multilayer actuator through which light used to provide an augmented reality image element passes.

In some examples, an apparatus (e.g., a head-mounted device such as an AR and/or VR device) may include an optical configuration including a pancake lens (e.g., a combination of a lens and a beamsplitter, which may also be termed a beamsplitter lens) and a reflective polarizer.

The optical configuration may be termed a folded optic configuration, and in this context, a folded optic configuration may provide a light path that includes one or more reflections and/or other beam redirections. An apparatus having a folded optic configuration may be compact, have a wide field-of-view (FOV), and allow formation of high-resolution images. Higher lens system efficiency may be useful for applications such as head-mounted displays (HMDs), including virtual reality and/or augmented reality applications.

An example apparatus may include a display, a pancake lens (e.g., including a beamsplitter or polarized reflector that may be formed as a coating on a lens surface), and a reflective polarizer (e.g., configured to reflect a first polarization of light and transmit a second polarization of light, where the first polarization and second polarization are different). For example, a reflective polarizer may be configured to reflect one handedness of circular polarized light and transmit the other handedness of circularly polarized light.

An example apparatus, such as a head-mounted device, may include a lens assembly including a lens and a reflective polarizer. An example reflective polarizer may be configured to reflect one polarization of light and transmit another polarization of light. For example, an example reflective polarizer may reflect one handedness of circularly polarized light and may transmit the other handedness of circularly polarized light. An example reflective polarizer may reflect one linear polarization direction and transmit an orthogonal linear polarization direction. An example apparatus may include a display, and the display may be configured to emit polarized light. In some examples, an apparatus may be an augmented reality and/or virtual reality (AR/VR) headset.

In some examples, an apparatus may include a display and an optical configuration. The optical configuration may include a first lens assembly and a second lens assembly. The first lens assembly may include a lens, such as a fluid lens (e.g., a liquid lens) and/or a Fresnel lens. The first lens assembly may include a reflective polarizer or a beamsplitter. An example reflective polarizer may be configured to reflect a first polarization and transmit a second polarization of incident light. The optical configuration may form an image of the display viewable by a user when the user wears the apparatus, and the image may provide an augmented reality image to the user.

Folded optic configurations (e.g., including one or more reflective elements such as beamsplitters and/or reflective polarizers) may be compact, have a wide field-of-view (FOV), and provide higher resolution for a given distance between the display and a viewer. Additionally, it may be valuable to adjust an eye focus distance (e.g., a visual accommodation) to an augmented reality image element to obtain a desired visual accommodation in the eye of the user. In some examples, the visual accommodation for a viewed image may be adjusted to at least approximately match an image distance corresponding to the user eye vergence used to view the provided left and right eye images. In this context, vergence may relate to an apparent distance to an image based on convergence of the viewing directions of left and right eyes, and visual accommodation (or, more concisely, accommodation) may refer to an apparent distance to the image based on the focal length of the eye. Visual accommodation may be adjusted by adjusting the optical power of at least one lens.

In some examples, the optical configuration may also provide a prescription lens adjustment of a real world image, for example, including corrections for optical power, cylinder and/or astigmatism. In some examples, a lens assembly may include a lens, such as a Fresnel lens, fluid lens or other refractive lens, and a beamsplitter and/or polarizing reflector.

In some examples, an apparatus component such as a lens or other optical element may include one or more optical materials. An example optical material may be selected to provide low birefringence (e.g., less than one quarter wavelength optical retardance, such as less than approximately $\lambda/10$, for example, less than approximately $\lambda/20$). In some examples, a Fresnel lens and/or filler polymer (and/or other optical element) may include a silicone polymer such as polydimethylsiloxane (PDMS), cyclic olefin polymer (COP), cyclic olefin copolymer (COC), polyacrylate, polyurethane, polycarbonate, or other polymer. For example, a silicone polymer (e.g., PDMS) lens may be supported on a rigid substrate such as glass or a polymer (e.g., a relatively rigid polymer compared with the silicone polymer). In some examples, the optical power of a silicone polymer lens having at least one curved surface may be adjusted using an actuator, such as a multilayer actuator.

In some examples, a component of an optical configuration may include one or more optical materials. For example, an optical material may include glass or an optical plastic. An optical material may be generally transmissive over some or all of the visible spectrum. In some examples, an optical component including a generally transmissive material may have an optical transmissivity of greater than 0.9 over some or all of the visible spectrum and may be termed optically transparent.

In some examples, a substrate (e.g., for a reflector), an optical material, and/or a layer (e.g., of an optical component) may include one or more of the following: an oxide (e.g., silica, alumina, titania, other metal oxide such as a transition metal oxide, or other non-metal oxide); a semiconductor (e.g., an intrinsic or doped semiconductor such as silicon (e.g., amorphous or crystalline silicon), carbon, germanium, a pnictide semiconductor, a chalcogenide semiconductor, or the like); a nitride (e.g., silicon nitride, boron nitride, or other nitride including nitride semiconductors); a carbide (e.g., silicon carbide), an oxynitride (e.g., silicon oxynitride); a polymer; a glass (e.g., a silicate glass such as a borosilicate glass, a fluoride glass, or other glass); or other material.

Example reflective polarizers may include, without limitation, cholesteric reflective polarizers (CLCs) and/or multilayer birefringent reflective polarizers. These and other examples are discussed in more detail below. A reflective polarizer may include a wire grid, a multilayer birefringent polymer, or a cholesteric reflective polarizer. In this context, a cholesteric reflective polarizer may have optical properties similar to (and in some examples, derived from) a cholesteric liquid crystal. A cholesteric reflective polymer may include a solid (e.g., have at least one solid component), such as a polymer (e.g., a cross-linked polymer), a polymer stabilized material or a polymer-dispersed material.

In some examples, a reflective polarizer may be fabricated by applying an alignment layer (e.g., a polymer layer or grating) and applying at least one layer of a cholesteric liquid crystal (CLC) which is at least partially aligned to alignment layer. The alignment layer may include a photoalignment material (PAM) that may be deposited on a substrate, and a desired molecular orientation may be obtained by exposing the PAM to polarized light (such as ultraviolet (UV) and/or visible light). A CLC may be further processed to lock the molecular alignment of a CLC within a solid material, for example, to provide a chiral material such as a chiral solid. For example, a CLC may be polymerized, cross-linked, and or a polymer network may be formed through the CLC to stabilize the alignment to provide a chiral solid. A chiral solid may be referred to as a CLC-based material if a CLC phase was used in its preparation. In some examples, a CLC may be formed using an effective concentration of chiral dopant within a nematic liquid crystal, and the chiral nematic (cholesteric) mixture may further include polymerizable materials.

In some examples, a reflective polarizer may include a chiral material such as a material having molecular ordering similar to that of a cholesteric liquid crystal, such as a solid material derived from cooling, polymerizing, cross-linking, or otherwise stabilizing the molecular order of a cholesteric liquid crystal. For example, a chiral solid may be a solid having a helical optical structure similar to that of a cholesteric liquid crystal. For example, a direction of maximum refractive index may describe a helix around a normal to the local direction of molecular orientation.

Examples may include an apparatus including a folded optic configuration, such as an apparatus including one or more lenses, such as a pair of lens assemblies. Example optical configurations may allow an increased optical efficiency of an optical configuration, for example, by reducing losses associated with beamsplitters. Increased optical efficiency may provide one or more of the following aspects: improved image appearance (e.g., improved image brightness, uniformity and/or resolution), increased lens efficiency, reduced power consumption, and/or reduced heat generation for a given brightness. Examples also include associated methods, such as methods of fabrication of improved lens assemblies, methods of fabricating devices including one or more actuators and/or lens assemblies, or methods of device use.

In some examples, a reflective polarizer may include a birefringent multilayer optical film that may be conformed to a surface (e.g., the faceted substrate of a Fresnel lens or a membrane surface of an adjustable fluid lens) through a combination of heat and pressure.

In some examples, the reflective polarizer may include a cholesteric liquid crystal, a birefringent multilayer optical film, or a wire grid. In some examples, a reflective polarizer may include an arrangement of electrically conductive elements, such as wires, rods, tubes, or other conductive elements Electrically conductive elements may include at least one metal (e.g., copper, gold, silver, or other metal or alloy thereof), electrically conductive carbon allotrope, doped semiconductor, or the like. In some examples, a reflective polarizer may include a birefringent multilayer film, and the skin layer or layers may have a pass polarization refractive index that is within 0.2 of the average refractive index of the multilayer film, and in some examples, a refractive index that differs from the average refractive index of the multilayer film by at least approximately 0.02, such as at least approximately 0.05, for example, at least approximately 0.1. In some examples, a reflective polarizer may include a multilayer assembly including at least one optically isotropic layer adjacent to (e.g., alternating with) a birefringent (e.g., uniaxial) polymer layer. Layers may be generally parallel and may conform to an underlying optical element that may act as a substrate. An optically isotropic polymer layer may include an optically transparent polymer. A birefringent polymer layer may include an anisotropic polymer layer, such as a stretched or otherwise at least partially molecularly aligned polymer layer. For example, a polymer layer may be stretched by a factor of between 1.5 and 10 (e.g., stretched by a ratio of between 1.5:1 and 10:1, where the ratio represents a ratio of a final extent along a particular direction to an initial extent).

An example reflective polarizer may be configured to reflect a first polarization of light and transmit a second polarization of light. For example, a reflective polarizer may be configured to reflect one handedness of circularly polarized light (e.g., right or left) and transmit the other handedness of circularly polarized light (e.g., left or right, respectively). For example, a reflective polarizer may be configured to reflect one direction of linear polarized light (e.g., vertical) and transmit an orthogonal direction of linearly polarized light (e.g., horizontal). In some examples, the reflective polarizer may be adhered to a lens surface, such as the facets of a Fresnel lens.

In some examples, a reflective polarizer may include a cholesteric liquid crystal, such as a polymer cholesteric liquid crystal, or a solid layer having the optical properties of a cholesteric liquid crystal (e.g., a crosslinked or network stabilized CLC). In some examples, a reflective polarizer may include a birefringent multilayer reflective polarizer. In some examples, an example apparatus may further include an optical retarder, such as a quarter wave retarder, located between the beamsplitter and the reflective polarizer.

Example reflective polarizers (or other polarizers) may include polarizing films. An example polarizing film may include one or more layers, such as an optical polarizer including a combination of a reflective polarizer and a dichroic polarizer, for example, bonded together.

In some examples, a polarizing beam splitter may include a transparent lens with a first and a second surface, where the first surface may be an adjustable lens (e.g., a fluid lens, a Fresnel lens, or other lens) and the second surface is adjacent to a reflective polarizing layer. At least one of the first and second surfaces may have a cylindrical, spherical, or other aspherical curvature that may be controlled using an actuator.

In some examples, a reflector may include a reflective polarizer and/or a beamsplitter (e.g., a partial reflector). A partial reflector may include a coating that is partially reflective and partially transparent to at least one operational wavelength. In some examples, a reflector may change the handedness of reflected circularly polarized light. The reflector may include at least one thin uniform metallic coating, such as at least one of a thin silver or aluminum coating, a patterned metallic coating, a dielectric coating, other coating, or any combination thereof.

In some examples, a polarizer layer may include an arrangement of microparticles and/or nanoparticles in an optical material, such as a polymer matrix. Example optical materials may include one or more fluoropolymers (e.g., polymers of one or more monomer species such as tetrafluoroethylene, vinylidene fluoride, chlorotrifluoroethylene, perfluoroalkoxy compounds, fluorinated ethylene-propylene, ethylenetetrafluoroethylene, ethylenechlorotrifluoroethylene, perfluoropolyether, perfluoropolyoxethane, and/or hexafluoropropylene oxide). Example polymers may include organosilicon compounds such as silicone polymers, including polymers of siloxane or silyl derivatives such as silyl halides. Polymers may also include polymers of one or more monomer species such as ethylene oxide, propylene oxide, carboxylic acid, acrylates such as acrylamide, amines, ethers, sulfonates, acrylic acid, vinyl alcohol, vinylpyridine, vinypyrrolidone, acetylene, heterocyclic compounds such as pyrrole, thiophene, aniline, phenylene sulfide, imidazole, or other monomer species. Particles may include particles including one or more materials such as metals (e.g., transition metals, aluminum, alloys), metal oxides (e.g., transition metal oxides, magnesium oxide, aluminum oxide, zinc oxide, zirconium oxide, or transparent conductive oxides such as indium tin oxide or antimony tin oxide), carbides, nitrides, borides, halides, fluoropolymers, carbonates (e.g., calcium carbonate), carbon allotropes (e.g., fullerenes or carbon nanotubes), and mixtures thereof. Examples also include glass particles, ceramic particles, silicates, or silica. Particles may include one or more polymers, including polymers described herein, such as poly(tetrafluoroethylene) particles. As used herein, particles may include microparticles, nanoparticles, spherical particles, rods, tubes, or other geometric or non-geometric shapes.

In some examples, an apparatus may include an optical configuration including a Fresnel lens assembly. In some examples, an example Fresnel lens assembly may include a reflective polarizer, for example, configured to reflect a first polarization of light and transmit a second polarization of light. For example, a reflective polarizer may reflect one handedness of circular polarized light and transmit the other handedness of circularly polarized light. Example apparatus may include a beamsplitter lens or, in some examples, a second Fresnel lens assembly. A beamsplitter lens may include a beamsplitter formed as a coating on a lens.

Fresnel lens assemblies including a reflective polarizer may be used in augmented reality and/or virtual reality (AR/VR) systems. In some examples, a Fresnel lens assembly may include a Fresnel lens and at least one other optical component, such as one or more of a reflective polarizer, an optical filter, an absorbing polarizer, a diffractive element, an additional refractive element, a reflector, an antireflection film, a mechanically protective film (e.g., a scratch-resistant film), or other optical component. An apparatus including a Fresnel lens assembly may further include a display and a beamsplitter.

In some examples, an AR/VR system may include a Fresnel lens assembly including a Fresnel lens and a polarized reflector. The optical properties of the Fresnel lens may be optimized individually, but in some examples, the properties of a reflective polarizer, filler layer, or other layer may be configured to improve the Fresnel lens performance (e.g., by reducing chromatic aberration). In some examples, a Fresnel lens may be concave, convex, or may have a complex optical profile such as a freeform surface. For example, the structured surface of a Fresnel lens may include facets corresponding to portions of a freeform lens optical surface, or of other lens surfaces such as other concave or convex surfaces.

The wavelength-dependent properties of a Fresnel lens assembly, or polarized reflector, may be adjusted by, for example, adjusting one or more parameters of a multilayer film configuration (e.g., individual layer refractive indices, optical dispersion, and/or layer thicknesses). In some examples, a reflective polarizer may have a particular bandwidth of operation and the bandwidth of operation may be adjusted using one or more parameters of one or more components (e.g., refractive index, optical dispersion, layer thickness, and the like).

Applications of Fresnel lens assemblies may include use in the optical configuration of a wearable device (e.g., a head-mounted device), for example, use of one or more Fresnel lens assemblies in an optical configuration configured to form an image of a display viewable by a user when the user wears the wearable device. Other example applications may include IR (infra-red) rejection in, for example, imaging, display, projection, or photovoltaic systems. Applications may include wavelength selection for optical waveguides, for example, to select red, green, yellow, and/or blue wavelengths for transmission along a waveguide using a Fresnel lens assembly at the waveguide input. In some examples, a structured surface may be formed at the light entrance to any suitable optical component and configured as a Fresnel lens assembly.

A Fresnel lens assembly may include a Fresnel lens and a polarizer. For example, at least one facet of a Fresnel lens may support a reflective polarizer or absorption polarizer. A Fresnel lens may include a plurality of facets and steps formed in an otherwise planar surface, a cylindrical surface, a freeform surface, a surface defined at least in part by a Zernike function, or a spherical surface. A Fresnel lens assembly may include additional components, such as a substrate, filler polymer layer, or any suitable optical element.

In some examples, a Fresnel lens assembly may include a Fresnel lens and a reflective polarizer. In some examples, the reflective polarizer may be supported by (e.g., deposited on, adhered to, or otherwise supported by) the facets of the Fresnel lens.

In some examples, a Fresnel lens assembly including a reflective polarizer may further include a filler layer. The filler layer may include an optically clear layer that is located on the structured surface of the Fresnel lens assembly. For example, a filler layer may conform to the facets and steps of a structured surface (e.g., of a Fresnel lens) and has a second surface without facets or steps, for example, a generally smooth surface. For example, the filler layer may have a planar, concave or convex surface that may also be an exterior surface or support one or more additional layers, such as an antireflection layer or other optical layer. A reflective polarizer may be formed on a facet of a structured optical element, such as a Fresnel lens. In some examples, a reflective polarizer may include a multilayer reflective polarizer including at least one birefringent layer. In some examples, a reflective polarizer may include one or more polymer layers and/or one or more inorganic layers.

In some examples, a structured optical element may include a substrate having a surface including facets and steps, where the steps are located between neighboring (e.g., proximate or substantially adjacent) facets. A reflective polarizer may be located adjacent to and conforming to at least a portion of a faceted surface. In some examples, a faceted surface may correspond to a surface portion of a refractive lens, such as a convex or concave surface, and may be curved. In some examples, a facet may be planar and may approximate a surface portion of a refractive lens. For example, a planar faceted surface may have an orientation to the optic axis of the lens that varies with the average (e.g., mean) radial distance of the facet from the optical center of the lens. In this context, a structured optical element may include surface facets separated by steps, and at least one facet of a Fresnel lens may support a reflective polarizer. The filler material may then coat a surface of a Fresnel lens assembly (e.g., including facets, steps and the reflective polarizer). The filler layer may have a first surface having a profile that is complementary to the Fresnel lens assembly, and a second surface (e.g., an exterior surface) that may be a planar surface. In some examples, the second surface of the filler material may have a curved surface, such as a convex, concave, cylindrical, freeform, or other curved surface, or, in some examples, may include a second Fresnel lens structure.

In some examples, the steps between facets may have step heights and/or draft angles that may be a function of position within the optical element, for example, a function of radial distance from the optical center of a lens. In some examples, the gap between adjacent reflective polarizer segments may vary as a function of position within the optical element, such as a function of radial distance from the optical center of the lens In some examples, a Fresnel lens assembly includes at least one Fresnel lens and is configured to reflect a first polarization of light and transmit a second polarization of light. The Fresnel lens assembly may include a reflective polarizing layer disposed on the facets of the structured surface of a Fresnel lens.

In some examples, a structured optical element (e.g., a Fresnel lens) may include a substrate having at least two adjacent facets that are separated by a step (sometimes referred to as a riser), where the facets have facet surfaces, where a reflective polarizer layer is adjacent to and conforms to at least a portion of the facet surface of at least one of the facets.

In some examples, a lens may have an optical layer (e.g., a reflective polarizer, an absorbing polarizer, an optical retarder, an optical absorber or other optical layer) formed as a coating on a lens surface, such as one or more Fresnel lens facets. An optical layer may include a multilayer optical layer, a cholesteric liquid crystal or solid derived therefrom or having similar optical properties, an anisotropic layer or a layer including anisotropic electrical conductors.

In some examples, a Fresnel lens may include a reflective polarizer formed as a layer on one or more of the lens facets. The reflective polarizer may include a multilayer optical film, cholesteric liquid crystal, or an arrangement of anisotropic conductors. The facets and coating may be embedded in an optically clear layer, such as a filler polymer. The refractive indices and optical dispersions of the Fresnel lens material and the filler polymer may be selected to reduce chromatic aberration (e.g., colored fringes in the image). In some examples, optical materials (e.g., used in a Fresnel lens) may have a low birefringence (e.g., corresponding to less than a quarter wavelength optical retardance). In some examples, a Fresnel lens and/or filler polymer may include a silicone polymer such as polydimethylsiloxane (PDMS), cyclic olefin polymer (COP), cyclic olefin copolymer (COC), polyacrylate, polyurethane, or polycarbonate. For example, a PDMS Fresnel lens may be supported on a rigid substrate such as glass. Vapor deposition of coatings may lead to unwanted deposition on the risers between facets. Appropriately sectioned coating layers may be selectively located on the facets of a Fresnel lens using an elastomeric substrate. Fresnel lens supported reflective polarizers may be used in augmented reality and/or virtual reality (AR/VR) systems. Other components may include a display and a beamsplitter. In some examples, an AR/VR system may include a Fresnel lens supported beamsplitter, and lenses may be optimized separately. Fresnel lenses may be concave, convex, or may have complex optical profiles such as freeform surfaces. Wavelength-dependent properties may be adjusted by, for example, adjusting multilayer film configurations.

In some examples, a Fresnel lens may include a flexible and/or elastic material (e.g., a silicone polymer such as PDMS) and may be formed on an actuator, such as a multilayer actuator. In some examples, an actuator may be located between a relatively rigid substrate (e.g., glass or an acrylate polymer) and an elastomer-based Fresnel lens structure. Electrical signals applied to the actuator may be used to control the slope of the facets of the Fresnel lens and hence the optical power of the Fresnel lens.

In some examples, the facets of a Fresnel lens and an optional optical layer formed thereon may be embedded in an filler layer such as an optically transparent filler polymer layer. For example, a filler layer may be formed supported by an assembly including the Fresnel lens and the polarizer. The filler layer may include an optically transparent polymer. The filler layer may have a structured surface complementary to the Fresnel lens and any other coating disposed thereon, and a second surface that may be generally smooth (e.g., planar, concave, or convex) or, in some examples, may be faceted to provide additional optical power (e.g., using a second Fresnel lens formed in the filler layer). The refractive indices and optical dispersions of the Fresnel lens material and the filler polymer may be selected to reduce chromatic aberration (e.g., colored fringes in the image). Preferably, optical materials have low birefringence (e.g., less than one quarter wavelength optical retardance for at least one visible wavelength). An example Fresnel lens and/or optional filler polymer (discussed in more detail below) may include a silicone polymer such as polydimethylsiloxane (PDMS), cyclic olefin polymer (COP), cyclic olefin copolymer (COC), polyacrylate, polyurethane, or polycarbonate. For example, a PDMS Fresnel lens may be supported on a rigid substrate such as glass. Vapor deposition of coatings may lead to unwanted deposition on the risers between facets.

In some examples, a lens may have a polarizer, such as a reflective polarizer or absorptive polarizer, formed as a layer on at least one of the lens surfaces. The layer may include a multilayer optical film, cholesteric liquid crystal, or an arrangement of anisotropic conductors such as a nanowire arrangement. In some examples, the lens may be a Fresnel lens and the facets and any layer(s) may be embedded in a filler layer that may include an optically clear polymer. In some examples, a filler layer may planarize or otherwise smooth an exterior surface of a Fresnel lens assembly. The refractive indices and optical dispersions of the lens material and any additional layers may be configured to reduce chromatic aberration (e.g., to reduce visually discernable colored fringes in an image of the display). In some examples, the filler polymer may be configured as a second Fresnel lens, a geometric lens, and/or diffractive lens. For example, the filler polymer may have a first surface having facets forming an interface with the first Fresnel lens, and a second surface such as a non-faceted surface (e.g., a planar surface or a curved surface such as a concave, convex, aspheric or freeform surface) or a faceted surface. In some examples, the filler polymer may form a diffractive lens including diffractive elements on one or both surfaces. In some examples, a reflector or reflective polarizer may be located between the facets of the first Fresnel lens and the filler polymer.

Appropriately sectioned coating layers (e.g., at least partially reflective layers such as reflectors, beamsplitters or reflective polarizers) may be selectively located on the facets of an optical element (e.g., a lens such as a Fresnel lens) using any suitable approach, for example, using an elastomeric substrate or other substrate to urge the coating layer against a surface of the optical element. For example, lens (e.g., Fresnel lens) supported reflective polarizers may be used in augmented reality and/or virtual reality (AR/VR) systems. Additional components may include a display and a beamsplitter.

In some examples, the reflective polarizer may be patterned to be in registration with the facets of the Fresnel lens. The patterned reflective polarizer may be formed on an elastomer element, aligned with the facets, and then the elastomer element may be moved (e.g., by an actuator) so that the patterned reflective polarizer is urged in contact with the facets of the Fresnel lens.

In some examples, an AR/VR system may include a Fresnel lens supported beamsplitter, and lenses may be optimized separately. Fresnel lenses may be concave, convex, or may have complex optical profiles such as freeform surfaces. Wavelength-dependent properties may be adjusted by, for example, adjusting multilayer film configurations.

In some examples, an optical configuration may be used to introduce a phase delay into one or more polarization components of a light ray. Examples include quarter wave plates and half wave plates. In some examples, an optical retarder may be used to convert circular polarization into a linear polarization or vice versa.

In some examples, a reflective polarizer may include a cholesteric liquid crystal or solid material having a cholesteric liquid crystal like order. For example, a reflective polarizer may include a polymer cholesteric liquid crystal, such as a cross-linked polymer cholesteric liquid crystal. In some examples, the reflective polarizer may include a birefringent multilayer reflective polarizer combined with a quarter wave retarder placed between the reflective polarizer and a second reflector (e.g., a beamsplitter or other reflective polarizer). In some examples, a reflective polarizer may include an arrangement of nanoscale or microscale conductive elements, such as electrically conductive nanorods, nanowires, nanotubes, microrods, microwires, or microtubes. In some examples, a nanostructure (e.g., a nanorod, nanowire, or nanotube) may have at least one dimension (e.g., a diameter or analogous dimension) between 1 nm and 1 micron. In some examples, a microstructure (e.g., a microrod, microwire, or microtube) may have at least one dimension (e.g., a diameter or analogous dimension) between 1 micron and 100 microns.

A beamsplitter may be configured to reflect a first portion of incident light and transmit a second portion of incident light. In some examples, a beamsplitter lens may include a lens (e.g., a Fresnel lens or other lens) and a beamsplitter formed on at least a portion of a lens surface or, for example, at an interface between components of a lens assembly.

In some examples, a beamsplitter may be formed on the surface of a lens, such as on the facets of a Fresnel lens, using one or more of various approaches. For example, a beamsplitter may be formed on an elastic element and urged against the surface of an optical component such as a lens. A beamsplitter may be formed on a substrate and patterned to form portions sized to match the facets of a Fresnel lens.

An example reflective layer may include one or more metals such as aluminum or silver, and may be metallic. An example reflective layer may include one or more dielectric materials such as silica, aluminum oxide, hafnium oxide, titanium dioxide, magnesium oxide, magnesium fluoride, indium tin oxide, indium gallium zinc oxide, and the like, and mixtures thereof. An example reflective layer may include one or more dielectric layers, and may include a Bragg grating structure or similar multilayer structure.

Reflective layers may be formed by one or a combination of processes including thin film physical vapor deposition, chemical vapor deposition, or other suitable processes for depositing reflective layers, such as highly and/or partially reflective thin film coatings.

An example beamsplitter may include one or more regions having different transmissivity and/or reflectance, and may include one or more reflective layers. An example beamsplitter may include first and second regions, having a different reflectance, for example, for visible light or at least one visible wavelength of light. A beamsplitter may include a coating formed on a surface of the lens, such as a metal coating and/or a dielectric coating such as a dielectric multilayer. In some examples, the reflectance of the beamsplitter may vary as a function of spatial position within the beamsplitter. For example, a beamsplitter may include a first region having a first reflectance and a second region having a second reflectance. In some examples, a beamsplitter may have a higher reflectance toward the edges of the beamsplitter than within a central region of the beamsplitter.

An example beamsplitter may include a coating that is partially transparent and partially reflective. An example beamsplitter may include a thin coating including a metal such as gold, aluminum or silver. A thin coating may have a coating thickness in the range of approximately 10 nm to approximately 500 nm. An example beamsplitter may include one or more layers, such as dielectric thin film layers. In some examples, a beamsplitter may include at least one dielectric material, for example, as a dielectric layer or component thereof, such as silica, aluminum oxide, hafnium oxide, titanium dioxide, magnesium oxide, magnesium fluoride, and the like. An example beamsplitter may include a coating including at least one thin metal coating and/or at least one dielectric coating. An example beamsplitter may include at least one of an electrically conductive material (e.g., a metal, an electrically conductive metal oxide such as, indium tin oxide or indium gallium zinc oxide, or other conductive material) and a dielectric material, and may include a combination of an electrically conductive material and a dielectric material (e.g., as a coating including at least one layer).

In some examples, a beamsplitter may be formed on a convex, planar, or concave surface of a lens. In some examples, the lens may include a Fresnel lens. In some examples, a polarized reflector may be configured to function as a beamsplitter and may, for example, be configured to reflect a first percentage of a first polarization of light and a second percentage of a second polarization of light, where the first and second percentages may be different, while transmitting some, most, or effectively all of the non-reflected light.

An example reflector (e.g., a beamsplitter, polarized reflector, or other reflector) may include at least a first and a second region, where the first region may include a central region of the reflector, and the second region may include an outer region of the reflector. In some examples, a reflector (e.g., a beamsplitter or a polarized reflector for a particular polarization) may have a reflectance of about 100%, about 95%, about 90%, about 85%, about 80%, about 75%, about 70%, or within a range between any two examples values of these example reflectance values. For example, the second region may have a reflectance between approximately 75% and approximately 100%, such as a reflectance between approximately 85% and approximately 100%. In some examples, the second region may have a higher reflectance than the first region, such as at least 10% higher reflectance. In some examples, the relationship between reflectance and distance may be a monotonic smooth curve. In some examples, the relationship between reflectance and distance may be discontinuous or include transition regions with relatively high rates of change in reflectance. In some examples, there may be a gradual transition in reflectance of the beamsplitter from the first region to the second region within a transition region. The transition region may have a width (which may be termed a transition distance) that may be less than about 5 mm, such as less than 2 mm, such as less than 1 mm. In some examples, the transition region width may be less than 0.1 mm, such as less than 0.01 mm.

In some examples, a reflector (e.g., a beamsplitter or polarized reflector) may include a layer that is partially transparent and partially reflective. In some examples, a reflector may include a metal film formed on a substrate, such as a substrate including one or more optical materials. For example, the layer may include a metal layer (e.g., having a thickness between about 5 nm and about 500 nm, such as a thickness between 10 nm and 200 nm), such as a layer including one or more metals such as aluminum, silver, gold, or other metal such as an alloy. The layer may include a multilayer, and may include a corrosion protection layer supported by the exposed surface of the layer (e.g., on a metal layer). In some examples, the layer may include one or more dielectric layers, such as dielectric thin film layers. Dielectric layers may include one or more dielectric layers such as oxide layers (e.g., metal oxide layers or other oxide layers), nitride layers, boride layers, phosphide layers, halide layers (e.g., metal halide layers such as metal fluoride layers), or other suitable layers. In some examples, the device may include one or more metal layers and/or one or more dielectric layers. A substrate may include glass or an optical polymer.

In some examples, an apparatus may include a display, at least one Fresnel lens assembly including a polarized reflector, and optionally a beamsplitter lens including a beamsplitter. The reflectance of the beamsplitter and/or the polarized reflector may vary as a function of spatial position; for example, including a first region of relatively high optical transmission and a second region of relatively low optical transmission (e.g., of relatively higher reflectance). In this context, a segmented reflector may have at least two regions having different optical properties, such as regions of different values of reflectance, for example, for one or more visible wavelengths.

In some examples, a device may include a reflector having a gradual or effectively discontinuous transition in the reflectance of the reflector from the first region to the second region. A transition region may be located between the first region and the second region. As measured along a particular direction (e.g., a radial direction, normal to the periphery of the first region, or other direction) the transition region may extend over a transition distance between the first region and the second region. In some examples, the transition distance may have a length that is approximately or less than 5 mm, 1 mm, 0.1 mm, or 0.01 mm.

In some examples, a reflector may provide selective reflection over a particular wavelength range and/or for a particular polarization. For example, a reflector may include a Bragg reflector, and layer composition and/or dimensions may be configured to provide a desired bandwidth of operation.

In some examples, a reflector may be formed on an optical substrate such as a lens, and a combination of a lens and a reflector may be termed a reflector lens. A reflector lens may include an optical element having at least one curved surface. A reflector may include a reflective coating formed on or otherwise supported by a planar or a curved surface of an optical element such as a lens.

During fabrication of a reflector, different reflector regions having different values of optical reflectance may be defined by a masked deposition processes or using photolithography, or a combination thereof.

In some examples, a lens (such as a Fresnel lens) may include a surface such as a concave surface, a convex surface or a planar surface. In some examples, a device may include one or more converging lenses and/or one or more diverging lenses. An optical configuration may include one or more lenses and may be configured to form an image of at least part of the display at an eyebox. A device may be configured so that an eye of a user is located within the eyebox when the device is worn by the user. In some examples, a lens may include a Fresnel lens having facets formed on a substrate including an optical material. In some examples, an optical configuration may include one or more reflectors, such as mirrors and/or reflectors.

In some examples, apparatus efficiency may be increased using a pancake lens including a beamsplitter that has higher reflectance toward the edges of the beamsplitter than within a central region of the beamsplitter. Lens efficiency may be increased using a polarization-converting beamsplitter lens including a beamsplitter that has higher reflectivity toward the edges of the lens than within a central region of the lens. In some examples, a pancake lens may include a refractive lens and a beamsplitter that may be formed as a reflective coating on a surface of the lens. The reflective coating may have a spatially varying reflectance. In some examples, a pancake lens may include a polarization-converting beamsplitter lens.

In some examples, an apparatus may include a display (e.g., a display panel) and a folded optic lens. Light from the display panel incident on the folded optic lens may be circularly polarized, linearly polarized, elliptically polarized or otherwise polarized. In some examples, the display may be an emissive display or may include a backlight. An emissive display may include a light-emitting diode (LED) array, such as an OLED (organic light-emitting diode) array. In some examples, an LED array may include a microLED array, and the LEDs may have a pitch of approximately or less than 100 microns (e.g., approximately or less than 50 microns, approximately or less than 20 microns, approximately or less than 10 microns, approximately or less than 5 microns, approximately or less than 2 microns, approximately or less than 1 microns, or other pitch value).

In some examples, the display may emit polarized light, such as linearly polarized light or circularly polarized light. In some examples, the display may emit linear polarized light and an optical retarder may be used to convert the linear polarization to an orthogonal linear polarization. In some examples, the combination of an optical retarder and a linear reflective polarizer may be replaced with an alternative configuration, such as a circularly polarized reflective polarizer which may include a cholesteric liquid crystal reflective polarizer.

In some examples, the display may include a transmissive display (such as a liquid crystal display) and a light source, such as a backlight. In some examples, the display may include a spatial light modulator and a light source. An example spatial light modulator may include a reflective or transmissive switchable liquid crystal array.

In some examples, an apparatus may include a display configured to provide polarized light, such as circularly polarized light. A display may include an emissive display (e.g., a light-emitting display) or a display (e.g., a liquid crystal display) used in combination with a backlight.

In some examples, display light from the display incident on the beamsplitter lens is circularly polarized. The display may include an emissive display (such as a light-emitting diode display) or a light-absorbing panel (such as a liquid crystal panel) in combination with a backlight. An emissive display may include at least one LED array, such as an organic LED (OLED) array. An LED array may include a microLED array. An LED array may include LEDs having a pitch of less than about 100 microns (e.g., about 50 microns, about 20 microns, about 10 microns, about 5 microns, about 2 microns, or about 1 microns, etc.).

In some examples, a display may include a spatial light modulator and a light source (e.g., a backlight). A spatial light modulator may include a reflective or transmissive switchable liquid crystal array. In some examples, the light source (e.g., a backlight) may have and/or allow a spatial variation of illumination intensity over the display. In some examples, the light source may include a scanned source such as a scanned laser. In some examples, the light source may include an arrangement of light emissive elements, such as an array of light emissive elements. An array of light emissive elements may include an array of miniLED and/or microLED emissive elements.

In some examples, a display may include one or more waveguide displays A waveguide display may include a polychromatic display or an arrangement of monochromatic displays. A waveguide display may be configured to project display light from one or more waveguides into an optical configuration configured to form an image of at least part of the display at the eye box.

In some examples, the display brightness may be spatially varied to increase the imaged display brightness uniformity by at least, for example, about 10%, for example, about 20%, for example, about 30%, for example, about 40%, or by some other value. The display illumination variation may be dynamically controlled, for example, by a controller. In some examples, the dynamic illumination variation may be adjusted by a controller receiving eye tracking signals provided by an eye tracking system.

In some examples, the display may have a spatially adjustable brightness (e.g., a spatial variation in illumination intensity). In some examples, the adjustable brightness may be achieved by spatially varying the brightness of an emissive display or of a backlight. The display brightness and/or any spatial variation may be adjustable, for example, by a control circuit. In some examples, the light source may include a scannable light source, such as a laser. In some examples, the light source may include an array of light sources, such as an LED backlight. For example, the array of light sources may include a miniLED or microLED array. The display illumination may be spatially varied to increase the imaged display brightness uniformity by at least about 10% (e.g., about 20%, about 30%, about 40%, or other value). The spatial variation of illumination from the backlight may be dynamically adjusted, and the dynamic adjustment may be controlled by an eye tracking system.

In some example, an apparatus may include one or more actuators. For example, one or more actuators may be used to adjust the position an optical component along one or more translational or rotational directions. In some examples, at least one actuator may be used to adjust the optical power of a lens and/or to adjust the position, conformation, or other parameter of a first optical element relative to that of a second optical element or display.

In some examples, an actuator may include a piezoelectric actuator, for example, including a piezoelectric material such as a crystal or ceramic material. Example actuators may include an actuator material such as one or more of the following: lead magnesium niobium oxide, lead zinc niobium oxide, lead scandium tantalum oxide, lead lanthanum zirconium titanium oxide, barium titanium zirconium oxide, barium titanium tin oxide, lead magnesium titanium oxide, lead scandium niobium oxide, lead indium niobium oxide, lead indium tantalum oxide, lead iron niobium oxide, lead iron tantalum oxide, lead zinc tantalum oxide, lead iron tungsten oxide, barium strontium titanium oxide, barium zirconium oxide, bismuth magnesium niobium oxide, bismuth magnesium tantalum oxide, bismuth zinc niobium oxide, bismuth zinc tantalum oxide, lead ytterbium niobium oxide, lead ytterbium tantalum oxide, strontium titanium oxide, bismuth titanium oxide, calcium titanium oxide, lead magnesium niobium titanium oxide, lead magnesium niobium titanium zirconium oxide, lead zinc niobium titanium oxide, lead zinc niobium titanium zirconium oxide as well as any of the previous mixed with any of the previous and/or traditional ferroelectrics including lead titanium oxide, lead zirconium titanium oxide, barium titanium oxide, bismuth iron oxide, sodium bismuth titanium oxide, lithium tantalum oxide, sodium potassium niobium oxide, and lithium niobium oxide. Also lead titanate, lead zirconate, lead zirconate titanate, lead magnesium niobate, lead magnesium niobate-lead titanate, lead zinc niobate, lead zinc niobate-lead titanate, lead magnesium tantalate, lead indium niobate, lead indium tantalate, barium titanate, lithium niobate, potassium niobate, sodium potassium niobate, bismuth sodium titanate, or bismuth ferrite. One or more of the above-listed example actuator materials may also be used as an optical material, a layer (e.g., of an optical component) or a substrate material (e.g., as a substrate for a beamsplitter). In some examples, an actuator may be configured to adjust the position and/or conformation of an optical element, such as a lens.

In some examples, an apparatus may include a display and an optical configuration configured to provide an image of a display, for example, in a head-mounted device. The optical configuration may include one or more lenses, such as a Fresnel lens assembly including a Fresnel lens and a reflective polarizer. A reflective polarizer may be configured to reflect a first polarization and transmit a second polarization of incident light. The optical configuration may form an image of the display viewable by a user when the user wears the apparatus. Applications may also include IR rejection in, for example, imaging, display, or photovoltaic systems.

In some examples, an apparatus may include a display and an optical configuration configured to provide an image of a display, for example, in a head-mounted device. An example apparatus may include a display and an optical configuration including a first lens assembly and a second lens assembly. The first lens assembly may include a first lens, a first reflector and an actuator. The second lens assembly may include a second lens and a second reflector. An example apparatus may include a controller configured to apply at least one electrical signal to the actuator to control the optical power of the first lens. The display light may pass through the actuator, which may be transparent and may include a plurality of actuator layers. Examples also include related devices, methods, systems and computer-readable media.

Example Embodiments

Example 1: An example apparatus may include a display, a first lens assembly (e.g., including a first lens, a first reflector, and an actuator), a second lens assembly (e.g., including a second lens and a second reflector) and a controller, where the display is configured to emit display light when energized the apparatus is configured so that the display light passes through actuator, the actuator includes a plurality of actuator layers, and the controller is configured to apply at least one electrical signal to the actuator to control an optical power of the first lens.

Example 2. The apparatus of example 1, where at least one of the plurality of actuator layers includes a piezoelectric material.

Example 3. The apparatus of any of examples 1 or 2, where the piezoelectric material includes a piezoelectric polymer.

Example 4. The apparatus of any of examples 1-3, where the plurality of actuator layers includes a plurality of uniaxial layers, each uniaxial layer has an optic axis, and an orientation of the optic axis within a plane of each uniaxial layer differs from that of other uniaxial layers by at least 10 degrees.

Example 5. The apparatus of any of examples 1-4, where the plurality of actuator layers includes a clocked stack of birefringent layers.

Example 6. The apparatus of any of examples 1-5, where the plurality of actuator layers includes two birefringent layers having orthogonal optic axes.

Example 7. The apparatus of any of examples 1-6, where the plurality of actuator layers includes an alternating arrangement of piezoelectric layers and non-piezoelectric layers.

Example 8. The apparatus of any of examples 1-8, where the plurality of actuator layers is generally transparent to the display light.

Example 9. The apparatus of any of examples 1-9, where the controller is configured to apply an adjustable electrical signal to at least one actuator layer of the plurality of actuator layers.

Example 10. The apparatus of any of examples 1, where the apparatus is configured so that the display light passes through the first lens assembly, is reflected by the second reflector of the second lens assembly, is reflected by the first reflector of the first lens assembly, and then passes through the second lens assembly.

Example 11. The apparatus of any of examples 1-10, where the apparatus is configured so that the display light passes through the second lens assembly, is reflected by the first reflector of the first lens assembly, is reflected by the second reflector of the second lens assembly, and then passes through the first lens assembly.

Example 12. The apparatus of any of examples 1-11, where the first reflector includes a beamsplitter or a polarized reflector.

Example 13. The apparatus of any of examples 1, where the first lens is a fluid lens including an elastic membrane, and the actuator is supported by the elastic membrane.

Example 14. The apparatus of any of examples 1-13, where the apparatus includes a head-mounted device.

Example 15. The apparatus of example 14, where the head-mounted device is an augmented reality device.

Example 16. The apparatus of any of examples 14 or 15, where the head-mounted device is a virtual reality device.

Example 17. The apparatus of any of examples 14-16, where the display light forms an image at an eye of a user when the user wears the head-mounted device.

Example 18. An example lens assembly may include a substrate, an elastic membrane, a fluid located within an enclosure at least partially defined by the substrate and the elastic membrane, and an actuator formed on the elastic membrane, where the actuator includes a plurality of actuator layers, and each actuator layer of the plurality of actuator layers has an optic axis having an orientation different from that of other actuator layers.

Example 19. An example method may include emitting light from a display, transmitting the light through a first lens assembly, reflecting the light from a second lens assembly, reflecting the light from the first lens assembly so that the light passes through the second lens assembly, and adjusting an optical power of the first lens assembly using an actuator, where transmitting the light through a first lens assembly includes transmitting the light through the actuator, and the actuator includes a plurality of layers including at least one birefringent layer.

Example 20. The method of example 19, further including forming an augmented reality image or a virtual reality image using the light.

FIG. 12 shows an example control system that may be used in exemplary devices according to some embodiments. System 1200 may include a near-eye display (NED) 1210 and a control system 1220, that may be communicatively coupled to each other. The near-eye display 1210 may include adjustable lenses 1212, electroactive devices 1214, displays 1216 and a sensor 1218. Control system 1220 may include a control element 1222, a force lookup table 1224 and augmented reality logic 1226.

Augmented reality logic 1226 may determine what virtual objects are to be displayed and real-world positions onto which the virtual objects are to be projected. Augmented reality logic 1226 may generate an image stream 1228 that is displayed by displays 1216 in such a way that alignment of right- and left-side images displayed in displays 1216 results in ocular vergence toward a desired real-world position. In some examples, electrical signals may be applied to an actuator to adjust the accommodation distance to match the vergence distance.

The control element 1222 (which may be referred to as a controller) may be configured to control at least one adjustable lens, for example, a fluid lens located within a near-eye display. Lens adjustment may be based on the desired perceived distance to a virtual object (this may, for example, include augmented reality image elements).

Control element 1222 may use the same positioning information determined by augmented reality logic 1226, in combination with force lookup table (LUT) 1224, to determine an amount of force to be applied by electroactive devices 1214 (e.g., actuators), as described herein, to adjustable lenses 1212. Electroactive devices 1214 may, responsive to control element 1222, apply appropriate forces to adjustable lenses 1212 to adjust the apparent accommodation distance of virtual images displayed in displays 1216 to match the apparent vergence distance of the virtual images, thereby reducing or eliminating vergence-accommodation conflict. Control element 1222 may be in communication with sensor 1218, that may measure a state of the adjustable lens. Based on data received from sensor 1218, the control element 1222 may adjust electroactive devices 1214 (e.g., as a closed-loop control system).

In some embodiments, display system 1200 may display multiple virtual objects at once and may determine which virtual object a user is viewing (or is likely to be viewing) to identify a virtual object for which to correct the apparent accommodation distance. For example, the system may include an eye-tracking system (not shown) that provides information to control element 1222 to enable control element 1222 to select the position of the relevant virtual object and may be used to modify the accommodation distance by adjusting one or more lens optical powers.

Additionally or alternatively, augmented reality logic 1226 may provide information about which virtual object is the most important and/or most likely to draw the attention of the user (e.g., based on spatial or temporal proximity, movement and/or a semantic importance metric attached to the virtual object). In some embodiments, the augmented reality logic 1226 may identify multiple potentially important virtual objects and select an apparent accommodation distance that approximates the virtual distance of a group of the potentially important virtual objects.

Control system 1220 may represent any suitable hardware, software, or combination thereof for managing adjustments to adjustable lenses 1212. In some embodiments, control system 1220 may represent a system on a chip (SOC). As such, at least one portion of control system 1220 may include one or more hardware modules. Additionally or alternatively, at least one portion of control system 1220 may include one or more software modules that perform at least one of the tasks described herein when stored in the memory of a computing device and executed by a hardware processor of the computing device.

Control system 1220 may generally represent any suitable system for providing display data, augmented reality data and/or augmented reality logic for a head-mounted display. In some embodiments, a control system 1220 may include a graphics processing unit (GPU) and/or any other type of hardware accelerator designed to optimize graphics processing.

Control system 1220 may be implemented in various types of systems, such as augmented reality glasses. A control system may be used to control operation of at least one of a display, a light source, an adjustable lens, image rendering, sensor analysis and the like. In some embodiments, a control system may be integrated into a frame of an eyewear device. Alternatively, all or a portion of control system may be in a system remote from the eyewear, and, for example, configured to control electroactive devices (e.g., actuators), display components, or other optical components in the eyewear via wired or wireless communication.

The control system, which in some examples may also be referred to as a controller, may control the operations of the light source and, in some cases, the optics system, that may include control of at least one lens. In some embodiments, the controller may be the graphics processing unit (GPU) of a display device. In some embodiments, the controller may include at least one different or additional processors. The operations performed by the controller may include taking content for display and dividing the content into discrete sections of a display, adjusting the focus of one or more adjustable lenses, providing a video signal to the display (e.g., based on a stored program or data received through a wired or wireless communications link), or adjusting in any manner one or more electrical and/or optical parameters of the device. The controller may instruct the light source to sequentially present the discrete sections using light emitters corresponding to a respective row in an image ultimately displayed to the user. The controller may instruct the optics system to adjust the light. For example, the controller may control the optics system to scan the presented discrete sections to different areas of a coupling element of the light output. Each discrete portion may be presented in a different location at the exit pupil. While each discrete section is presented at different times, the presentation and scanning of the discrete sections may occur fast enough such that a user's eye integrates the different sections into a single image or series of images. The controller may also provide scanning instructions to the light source that include an address corresponding to an individual source element of the light source and/or an electrical bias applied to an individual source or display element.

An example control system (that may also be termed a controller) may include an image processing unit. The controller, or component image processing unit, may include a general-purpose processor and/or at least one application-specific circuit that is dedicated to performing the features described herein. In one embodiment, a general-purpose processor may be coupled to a memory device to execute software instructions that cause the processor to perform certain processes described herein. In some embodiments, the image processing unit may include at least one circuit that is dedicated to performing certain features. The image processing unit may be a stand-alone unit that is separate from the controller and the driver circuit, but in some embodiments the image processing unit may be a sub-unit of the controller or the driver circuit. In other words, in those embodiments, the controller or the driver circuit performs various image processing procedures of the image processing unit. The image processing unit may also be referred to as an image processing circuit.

Ophthalmic applications of the devices described herein may include spectacles with a flat front (or other curved) substrate and an adjustable eye-side concave or convex membrane surface. Applications include optics, augmented reality, or virtual reality headsets. Example devices may include head-mounted-display devices such as augmented reality and/or virtual reality devices.

An example control system may be used to provide at least one of the following functions: to control the image displayed by the device, receive an analyze sensor data, or to adjust at least one adjustable lenses. In some examples, a control system may include a display system, and may be used to adjust an image shown on a display. In some examples, a control system may be used to adjust the optical properties of at least one optical element, such as the focal length of a lens, the orientation of an optical element, the stretching of a layer (such as an elastic layer, e.g., an elastic Fresnel lens), or to adjust any other optical component. In some examples, a control system may be used to adjust the light output power of a light source, for example, in response to ambient brightness, the importance of an augmented reality or virtual reality image element, or to achieve a user-controlled setting such as contrast ratio or brightness.

FIG. 13 shows an example multilayer actuator 1300 having 8 independently electroded electroactive layers 1310, 1315, 1320, 1325, 1330, 1335, 1340 and 1345. Each electroactive layer 1310-1345 is disposed between a corresponding electrode pair, for example, first electrode 1305a and second electrode 1305b may respectively overlie and underlie electroactive layer 1310. The paired electrodes are connected to a corresponding floating voltage source V1-V8 and may be controlled by a controller.

In some examples, one or more of the electroactive layers 1310-1345 may be characterized by an asymmetric in-plane mechanical response. In some examples, one or more of the electroactive layers 1310-1345 may be uniaxially oriented. In some examples, the in-plane mechanical anisotropy of one or more of the electroactive layers 1310-1345 may be at least approximately 2, for example, approximately 2, 5, 10, or 20, including ranges between any of the foregoing values. Electroactive layers 1310-1345 may be arranged to have various relative alignments of their respective in-plane orientations.

In an example multilayer actuator, the orientation of each electroactive layer may be independently arranged to provide an individually-actuatable contribution to an overall deformation response. In some examples, the angular registration of the plural electroactive layers for the 8-layer multilayer actuator of FIG. 13 may describe a rotation.

FIG. 14 shows an example lens including an example multilayer actuator which may be similar to that discussed above in relation to FIG. 13. The actuator 1400 may include a plurality of independently electroded electroactive layers 1410, 1415, 1420, 1425, 1430, 1435, 1440 and 1445. Each electroactive layer 1410-1445 may be disposed between a corresponding electrode pair. In some examples the thickness of each electroactive layer 1410-1445 may be independently selected from within the range of approximately 30 micrometers to approximately 200 micrometers, for example, 30, 40, 50, 60, 70, 80, 90, 100, 120, 140, 160, 180, or 200 micrometers, including ranges between any of the foregoing values.

Actuation and the attendant displacement of one or more layers within a stacked actuator may be used to generate a desired deformation in a surface of a lens or other optical element, including the introduction of sphere and/or cylinder profiles and/or adjustment of any other optical parameter. Deformation of the lens may be used to obtain spherical and/or cylinder optical adjustments, to adjust the location of the optical axis of the lens (e.g., to match user eye separation) or to adjust the orientation of the optical axis of the lens (e.g., to adjust apparent vergence and optionally to help equalize vergence and accommodation distances).

In some examples, an adjustable fluid lens (e.g., an adjustable liquid lens) may include a substrate, an actuator overlying the substrate, a liquid layer disposed between the substrate and a membrane. The membrane (e.g., an elastic membrane) may provide a curved profile and the optical power of the lens may include a contribution from the radius of the curved profile of the membrane. The actuator may be associated with the membrane, for example, the actuator may be supported by the membrane. In some examples, one or more layers of the actuator may be provided by the membrane. An edge seal may be located between the substrate and the membrane to form an enclosure that may be filled with a fluid, such as a liquid. The actuator may be configured to adjust the spherical and/or cylinder radius and optical axis of the fluid lens. The actuator may include a stack of electromechanical layers and electrodes configured to apply an electric field independently across each of the electromechanical layers, where an orientation of neighboring electromechanical layers may, in some examples, differ by at least approximately ten degrees.

FIG. 15 shows an exemplary active fluid lens that may be used in connection with various embodiments. FIG. 15 depicts a cross-section through an example fluid lens, according to some embodiments. The fluid lens 1500 illustrated in this example includes a substrate 1502 (which in this example is a generally rigid, planar, substrate), a membrane 1550, a fluid 1508 (denoted by dashed horizontal lines), an edge seal 1585 and a support member 1590 providing a rigid support to the flexure shown generally at 1504. Optional flexures (flexible elements) 1504 are shown on opposite sides of the substrate. In this example, the flexure 1504 includes an elastic element 1510 and a rigid element 1540 including the rigid arm 1560 that may provide a membrane attachment. In some examples, the elastic element 1510 may be replaced by a rigid element. The rigid arm 1560 may provide a control point for the membrane where the membrane is attached to the rigid arm, for example, at connection point 1554. In this example, the substrate 1502 has a lower (as illustrated) outer surface and an interior surface which may optionally support a substrate coating. In this example, the interior surface of the substrate may be in contact with the fluid 1508. The membrane 1550 has an upper (as illustrated) outer surface and an interior surface enclosing the fluid 1508. The dashed line indicates the center of the fluid lens and the optical axis of the lens.

The fluid 1508 may be enclosed within an enclosure (e.g., an enclosed fluid volume) at least in part defined by the substrate 1502, the membrane 1550 and the edge seal 1585, which may cooperatively help define the enclosure in which the fluid is located. The edge seal 1585 may extend around the periphery of the enclosure and retain (in cooperation with the substrate and the membrane) the fluid within the enclosed fluid volume.

In some examples, FIG. 15 may represent a cross-section through a circular lens, though examples may also include non-circular lenses. In various examples, a fluid lens, such as discussed in relation to FIG. 15, may include one or more of any appropriate aspects discussed herein, for example, being included in a lens assembly with one or more of a reflector (e.g., a beamsplitter or other partial reflector, or reflective polarizer), absorbing polarizer, or other component.

An example liquid lens may be configured for one or more artificial reality applications, and may include a multilayer actuator (e.g., acting as the membrane, or otherwise associated with a membrane), an edge seal located between the membrane (e.g., an actuator) and a substrate and a fluid (e.g., a liquid) disposed between the membrane and the substrate and contained by the edge seal. In some examples, a multilayer actuator may directly overly the fluid and provide the function of an elastic membrane. In some examples, an actuator may include an elastic polymer and a piezoelectric polymer, such as an elastic piezoelectric polymer.

In accordance with some embodiments, a liquid lens may include a substrate, an actuator overlying the substrate, a liquid layer disposed between the substrate and the actuator and a seal located between the substrate and the actuator peripheral to the liquid layer, where the actuator is configured to create a variable cylinder radius and/or axis in a surface of the liquid layer (e.g., by acting on an elastic membrane at least in part enclosing the liquid layer). In such a liquid lens, the actuator may include a stack of electromechanical layers and electrodes configured to apply an electric field independently across each of the electromechanical layers, where an orientation of neighboring electromechanical layers differs by at least approximately 10°.

In some examples, a method may include forming an actuator over a transparent membrane or other substrate, the actuator including a stack of electromechanical layers and electrodes configured to apply an electric field independently across each of the electromechanical layers, where an orientation of neighboring electromechanical layers differs by at least approximately 10°, dispensing a liquid layer between the actuator and the substrate and applying a voltage to at least one of the electrodes to adjust a variable lens parameter (e.g., optical power, cylinder, or optical axis). In some embodiments, a different electrical signal may be applied to different ones of the electrodes. An example actuator may create a spherical profile in the surface of the liquid layer and/or may provide any adjustment to a lens parameter.

In some examples, an actuator (e.g., a multilayer actuator) may provide, be disposed on, or incorporated into the membrane of an adjustable fluid lens. For example, a multilayer actuator may be disposed on some or all of the membrane. For example, the multilayer actuator may be disposed on (or otherwise provide) at least one quarter of the area of the membrane and, in some examples, may be disposed on at least one third of the area of the membrane, such as disposed on at least one third of the area of the membrane. In some examples, the actuator may have a periphery of similar shape to the periphery of the membrane (or the lens). In some examples, the actuator may have a circular, oval, or similar shape. In some examples, the actuator may be formed as one or more shapes on the membrane, such as a stripe, rectangle, ring, or other shape. In some examples, the actuator may provide a portion of the membrane and an elastic polymeric material may provide the remainder of the membrane.

The membrane of an adjustable fluid lens may have a curved profile, so that the lens fluid has a greater thickness (e.g., a distance measured along the lens optical axis) in the center of the lens, compared to the periphery of the lens (e.g., proximate an edge seal). In some examples, the fluid lens may be a plano-convex lens, with the planar surface being provided by the substrate and the convex surface being provided by the membrane. A plano-convex lens may have a thicker layer of lens fluid near the center of the lens. However, other configurations are possible, such as a plano-concave lens configuration in which the membrane curves in towards the substrate near the center of the lens. The substrate may also have a curved surface that provides optical power to the fluid lens.

In some examples, the fluid lens may have a plurality of membrane connections arranged around the periphery (or within a peripheral region) of the substrate. A membrane support may attach the membrane to the substrate, optionally through a flexure element or other support structure. One or more actuators may exert a controllable force on the membrane and may be used to adjust the curvature of the membrane surface and hence one or more optical properties of the lens (e.g., focal length, astigmatism correction, cylindricity and the like). For example, an actuator may be mechanically coupled to the membrane. In some examples, the membrane of an adjustable fluid lens may be provided by an actuator, such as a multilayer actuator.

In some examples, a device, such as a device including a fluid lens (such as a liquid lens), may include a substrate (e.g., an optically transparent material such as an optical polymer or glass), a transparent elastic membrane where the membrane is in tension, and where the tension may be adjusted by an actuator, such as a multilayer actuator as described herein, to adjust the optical power or other optical parameter of the lens, such as astigmatism correction, cylinder, or freeform component of correction.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED (near-eye display, for example, within a head-mounted device) that may also provide visibility into the real world (such as, e.g., augmented-reality system 1600 in FIG. 16) or that visually immerses a user in an artificial reality (such as, e.g., virtual-reality system 1700 in FIG. 17). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users and/or any other suitable external system.

Turning to FIG. 16, augmented-reality system 1600 may include an eyewear device 1602 with a frame 1610 configured to hold a left display device 1615(A) and a right display device 1615(B) in front of a user's eyes. Display devices 1615(A) and 1615(B) may act together or independently to present an image or series of images to a user. While augmented-reality system 1600 includes two displays, embodiments of this disclosure may be implemented in augmented-reality systems with a single NED or more than two NEDs.

In some embodiments, augmented-reality system 1600 may include one or more sensors, such as sensor 1640. Sensor 1640 may generate measurement signals in response to motion of augmented-reality system 1600 and may be located on substantially any portion of frame 1610. Sensor 1640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1600 may or may not include sensor 1640 or may include more than one sensor. In embodiments in which sensor 1640 includes an IMU (inertial measurement unit), and the IMU may generate calibration data based on measurement signals from sensor 1640. Examples of sensor 1640 may include, without limitation, accelerometers, gyroscopes, magnetometers, other suitable types of sensors that detect motion, sensors used for error correction of the IMU, or some combination thereof.

In some examples, augmented-reality system 1600 may also include a microphone array with a plurality of acoustic transducers 1620(A)-1620(J), referred to collectively as acoustic transducers 1620. Acoustic transducers 1620 may represent transducers that detect air pressure variations induced by sound waves. Each acoustic transducer 1620 may be configured to detect sound and convert the detected sound into an electronic format (e.g., an analog or digital format). The microphone array in FIG. 16 may include, for example, ten acoustic transducers: 1620(A) and 1620(B), which may be designed to be placed inside a corresponding ear of the user, acoustic transducers 1620(C), 1620(D), 1620(E), 1620(F), 1620(G) and 1620(H), which may be positioned at various locations on frame 1610 and/or acoustic transducers 1620(I) and 1620(J), which may be positioned on a corresponding neckband 1605.

In some embodiments, one or more of acoustic transducers 1620(A)-(J) may be used as output transducers (e.g., speakers). For example, acoustic transducers 1620(A) and/or 1620(B) may be earbuds or any other suitable type of headphone or speaker.

The configuration of acoustic transducers 1620 of the microphone array may vary. While augmented-reality system 1600 is shown in FIG. 16 as having ten acoustic transducers 1620, the number of acoustic transducers 1620 may be greater or less than ten. In some embodiments, using higher numbers of acoustic transducers 1620 may increase the amount of audio information collected and/or the sensitivity and accuracy of the audio information. In contrast, using a lower number of acoustic transducers 1620 may decrease the computing power required by an associated controller 1650 to process the collected audio information. In addition, the position of each acoustic transducer 1620 of the microphone array may vary. For example, the position of an acoustic transducer 1620 may include a defined position on the user, a defined coordinate on frame 1610, an orientation associated with each acoustic transducer 1620, or some combination thereof.

Acoustic transducers 1620(A) and 1620(B) may be positioned on different parts of the user's ear, such as behind the pinna, behind the tragus, and/or within the auricle or fossa. Or, there may be additional acoustic transducers 1620 on or surrounding the ear in addition to acoustic transducers 1620 inside the ear canal. Having an acoustic transducer 1620 positioned next to an ear canal of a user may enable the microphone array to collect information on how sounds arrive at the ear canal. By positioning at least two of acoustic transducers 1620 on either side of a user's head (e.g., as binaural microphones), augmented-reality device 1600 may simulate binaural hearing and capture a 3D stereo sound field around about a user's head. In some embodiments, acoustic transducers 1620(A) and 1620(B) may be connected to augmented-reality system 1600 via a wired connection 1630, and in other embodiments acoustic transducers 1620(A) and 1620(B) may be connected to augmented-reality system 1600 via a wireless connection (e.g., a BLUETOOTH connection). In still other embodiments, acoustic transducers 1620(A) and 1620(B) may not be used at all in conjunction with augmented-reality system 1600.

Acoustic transducers 1620 on frame 1610 may be positioned in a variety of different ways, including along the length of the temples, across the bridge, above or below display devices 1615(A) and 1615(B), or some combination thereof. Acoustic transducers 1620 may also be oriented such that the microphone array is able to detect sounds in a wide range of directions surrounding the user wearing the augmented-reality system 1600. In some embodiments, an optimization process may be performed during manufacturing of augmented-reality system 1600 to determine relative positioning of each acoustic transducer 1620 in the microphone array.

In some examples, augmented-reality system 1600 may include or be connected to an external device (e.g., a paired device), such as neckband 1605. Neckband 1605 generally represents any type or form of paired device. Thus, the following discussion of neckband 1605 may also apply to various other paired devices, such as charging cases, smart watches, smart phones, wrist bands, other wearable devices, hand-held controllers, tablet computers, laptop computers, other external compute devices, etc.

As shown, neckband 1605 may be coupled to eyewear device 1602 via one or more connectors. The connectors may be wired or wireless and may include electrical and/or non-electrical (e.g., structural) components. In some cases, eyewear device 1602 and neckband 1605 may operate independently without any wired or wireless connection between them. While FIG. 16 illustrates the components of eyewear device 1602 and neckband 1605 in example locations on eyewear device 1602 and neckband 1605, the components may be located elsewhere and/or distributed differently on eyewear device 1602 and/or neckband 1605. In some embodiments, the components of eyewear device 1602 and neckband 1605 may be located on one or more additional peripheral devices paired with eyewear device 1602, neckband 1605, or some combination thereof.

Pairing external devices, such as neckband 1605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1600 may be provided by a paired device or shared between a paired device and an eyewear device, thus reducing the weight, heat profile, and form factor of the eyewear device overall while still retaining desired functionality. For example, neckband 1605 may allow components that would otherwise be included on an eyewear device to be included in neckband 1605 since users may tolerate a heavier weight load on their shoulders than they would tolerate on their heads. Neckband 1605 may also have a larger surface area over which to diffuse and disperse heat to the ambient environment. Thus, neckband 1605 may allow for greater battery and computation capacity than might otherwise have been possible on a stand-alone eyewear device. Since weight carried in neckband 1605 may be less invasive to a user than weight carried in eyewear device 1602, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1605 may be communicatively coupled with eyewear device 1602 and/or to other devices. These other devices may provide certain functions (e.g., tracking, localizing, depth mapping, processing, storage, etc.) to augmented-reality system 1600. In the embodiment of FIG. 16, neckband 1605 may include two acoustic transducers (e.g., 1620(I) and 1620(J)) that are part of the microphone array (or potentially form their own microphone subarray). Neckband 1605 may also include a controller 1625 and a power source 1635.

Acoustic transducers 1620(I) and 1620(J) of neckband 1605 may be configured to detect sound and convert the detected sound into an electronic format (analog or digital). In the embodiment of FIG. 16, acoustic transducers 1620(I) and 1620(J) may be positioned on neckband 1605, thereby increasing the distance between the neckband acoustic transducers 1620(I) and 1620(J) and other acoustic transducers 1620 positioned on eyewear device 1602. In some cases, increasing the distance between acoustic transducers 1620 of the microphone array may improve the accuracy of beamforming performed via the microphone array. For example, if a sound is detected by acoustic transducers 1620(C) and 1620(D) and the distance between acoustic transducers 1620(C) and 1620(D) is greater than, for example, the distance between acoustic transducers 1620(D) and 1620(E), the determined source location of the detected sound may be more accurate than if the sound had been detected by acoustic transducers 1620(D) and 1620(E).

Controller 1625 of neckband 1605 may process information generated by the sensors on neckband 1605 and/or augmented-reality system 1600. For example, controller 1625 may process information from the microphone array that describes sounds detected by the microphone array. For each detected sound, controller 1625 may perform a direction-of-arrival (DOA) estimation to estimate a direction from which the detected sound arrived at the microphone array. As the microphone array detects sounds, controller 1625 may populate an audio data set with the information. In embodiments in which augmented-reality system 1600 includes an inertial measurement unit, controller 1625 may compute all inertial and spatial calculations from the IMU located on eyewear device 1602. A connector may convey information between augmented-reality system 1600 and neckband 1605 and between augmented-reality system 1600 and controller 1625. The information may be in the form of optical data, electrical data, wireless data, or any other transmittable data form. Moving the processing of information generated by augmented-reality system 1600 to neckband 1605 may reduce weight and heat in eyewear device 1602, making it more comfortable to the user.

Power source 1635 in neckband 1605 may provide power to eyewear device 1602 and/or to neckband 1605. Power source 1635 may include, without limitation, lithium ion batteries, lithium-polymer batteries, primary lithium batteries, alkaline batteries, or any other form of power storage. In some cases, power source 1635 may be a wired power source. Including power source 1635 on neckband 1605 instead of on eyewear device 1602 may help better distribute the weight and heat generated by power source 1635.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1700 in FIG. 17, that mostly or completely covers a user's field of view. Virtual-reality system 1700 may include a front rigid body 1702 and a band 1704 shaped to fit around a user's head. Virtual-reality system 1700 may also include output audio transducers 1706(A) and 1706(B). Furthermore, while not shown in FIG. 17, front rigid body 1702 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 1600 and/or virtual-reality system 1700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 1600 and/or virtual-reality system 1700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 1600 and/or virtual-reality system 1700 may include one or more optical sensors, such as two-dimensional (2D) or 3D cameras, structured light transmitters and detectors, time-of-flight depth sensors, single-beam or sweeping laser rangefinders, 3D LiDAR (light detection and ranging) sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (e.g., eye-tracking sensor data), transform the data (e.g., into one or more of gaze direction, object viewed, or other vision parameter), output a result of the transformation to perform a function (e.g., modify an augmented reality environment, modify a real environment, modify an operational parameter of a real or virtual device, provide a control signal to an apparatus such as an electronic device, vehicle, or other apparatus), use the result of the transformation to perform a function, and store the result of the transformation to perform a function (e.g., in a memory device). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Discs (CDs), Digital Video Disc (DVDs), or BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein may be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus comprising:
a display;
a first lens assembly comprising a first lens, a first reflector, and an actuator;
a second lens assembly comprising a second lens and a second reflector; and
a controller, wherein:
the display is configured to emit display light when energized;
the apparatus is configured so that the display light passes through actuator;
the actuator comprises a plurality of actuator layers, each actuator layer of the plurality of actuator layers corresponding to different optic axis with respect to a neighboring actuator layer; and
the controller is configured to apply at least one electrical signal to the actuator to control an optical power of the first lens.

2. The apparatus of claim 1, wherein at least one of the plurality of actuator layers comprises a piezoelectric material.

3. The apparatus of claim 2, wherein the piezoelectric material comprises a piezoelectric polymer.

4. The apparatus of claim 1, wherein:
the plurality of actuator layers comprises a plurality of uniaxial layers;
each uniaxial layer has an optic axis; and
an orientation of the optic axis within a plane of each uniaxial layer differs from that of other uniaxial layers by at least 10 degrees.

5. The apparatus of claim 1, wherein the plurality of actuator layers comprises a clocked stack of birefringent layers.

6. The apparatus of claim 1, wherein the plurality of actuator layers comprises two birefringent layers having orthogonal optic axes.

7. The apparatus of claim 1, wherein the plurality of actuator layers comprises an alternating arrangement of piezoelectric layers and non-piezoelectric layers.

8. The apparatus of claim 1, wherein the plurality of actuator layers is generally transparent to the display light.

9. The apparatus of claim 1, wherein the controller is configured to apply an adjustable electrical signal to at least one actuator layer of the plurality of actuator layers.

10. The apparatus of claim 1, wherein the apparatus is configured so that the display light passes through the first lens assembly, is reflected by the second reflector of the second lens assembly, is reflected by the first reflector of the first lens assembly, and then passes through the second lens assembly.

11. The apparatus of claim 1, wherein the apparatus is configured so that the display light passes through the second lens assembly, is reflected by the first reflector of the first lens assembly, is reflected by the second reflector of the second lens assembly, and then passes through the first lens assembly.

12. The apparatus of claim 1, wherein the first reflector comprises a beamsplitter or a polarized reflector.

13. The apparatus of claim 1, wherein:
the first lens is a fluid lens comprising an elastic membrane; and
the actuator is supported by the elastic membrane.

14. The apparatus of claim 1, wherein the apparatus comprises a head-mounted device.

15. The apparatus of claim 14, wherein the head-mounted device is an augmented reality device.

16. The apparatus of claim 14, wherein the head-mounted device is a virtual reality device.

17. The apparatus of claim 14, wherein the display light forms an image at an eye of a user when the user wears the head-mounted device.

18. A lens assembly, comprising:
a substrate;
an elastic membrane;
a fluid located within an enclosure at least partially defined by the substrate and the elastic membrane; and an actuator formed on the elastic membrane, wherein:
   the actuator comprises a plurality of actuator layers; and
   each actuator layer of the plurality of actuator layers has an optic axis having an orientation different from that of other actuator layers.

19. A method, comprising:
emitting light from a display;
transmitting the light through a first lens assembly;
reflecting the light from a second lens assembly;
reflecting the light from the first lens assembly so that the light passes through the second lens assembly; and
adjusting an optical power of the first lens assembly using an actuator, wherein:
   transmitting the light through the first lens assembly comprises transmitting the light through the actuator; and
   the actuator comprises a plurality of layers comprising at least one birefringent layer.

20. The method of claim 19, further comprising forming an augmented reality image or a virtual reality image using the light.

\* \* \* \* \*